(12) United States Patent
Yamamoto

(10) Patent No.: US 9,182,068 B2
(45) Date of Patent: Nov. 10, 2015

(54) DISPLAY APPARATUS

(71) Applicant: Sony Corporation, Tokyo (JP)

(72) Inventor: Takeshi Yamamoto, Saitama (JP)

(73) Assignee: Sony Corporation (JP)

( * ) Notice: Subject to any disclaimer, the term of this patent is extended or adjusted under 35 U.S.C. 154(b) by 295 days.

(21) Appl. No.: 13/854,298

(22) Filed: Apr. 1, 2013

(65) Prior Publication Data

US 2014/0126125 A1 May 8, 2014

(30) Foreign Application Priority Data

Apr. 9, 2012 (JP) .................. 2012-088755

(51) Int. Cl.
*F16M 11/04* (2006.01)
*G02F 1/1333* (2006.01)

(52) U.S. Cl.
CPC ......... *F16M 11/04* (2013.01); *G02F 1/133308* (2013.01); *G02F 2001/133314* (2013.01); *G02F 2201/46* (2013.01); *G02F 2201/503* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,104,451 A | * | 8/2000 | Matsuoka et al. | 349/58 |
| 7,826,634 B2 | * | 11/2010 | Soga | 381/345 |
| 8,264,822 B2 | * | 9/2012 | Sakamoto et al. | 361/679.01 |
| 2003/0063059 A1 | * | 4/2003 | Farrow et al. | 345/92 |
| 2003/0063432 A1 | * | 4/2003 | Farrow et al. | 361/680 |
| 2003/0128503 A1 | * | 7/2003 | Takahashi | 361/681 |
| 2003/0169383 A1 | | 9/2003 | Kim | |
| 2004/0165344 A1 | * | 8/2004 | Lee | 361/681 |
| 2009/0256031 A1 | * | 10/2009 | Harita | 248/27.1 |
| 2010/0289401 A1 | * | 11/2010 | Ohtomo et al. | 313/495 |
| 2010/0328862 A1 | * | 12/2010 | Wang et al. | 361/679.01 |
| 2011/0095143 A1 | * | 4/2011 | Wang et al. | 248/122.1 |
| 2011/0310555 A1 | * | 12/2011 | Yamamoto et al. | 361/688 |
| 2013/0114003 A1 | * | 5/2013 | Tanaka | 348/836 |
| 2013/0135528 A1 | * | 5/2013 | Nicu | 348/552 |
| 2013/0265504 A1 | * | 10/2013 | Sato et al. | 348/836 |
| 2014/0036178 A1 | * | 2/2014 | Tanaka et al. | 349/33 |
| 2014/0184928 A1 | * | 7/2014 | Yokawa et al. | 348/794 |

FOREIGN PATENT DOCUMENTS

EP 2487526 A1 8/2012
JP 2010-243622 A 10/2010

OTHER PUBLICATIONS

European Search Report from EP Application No. 13159270, dated Jul. 25, 2013.

* cited by examiner

*Primary Examiner* — Lisa Lea Edmonds
(74) *Attorney, Agent, or Firm* — Lerner, David, Littenberg, Krumholz & Mentlik, LLP

(57) ABSTRACT

A display apparatus includes: a display displaying images on a display surface; a back chassis arranged in a position opposite to the display surface of the display; and a rear cover arranged in a position opposite to a surface of the back chassis which faces the display, wherein through holes piercing in a thickness direction are formed in the back chassis and reinforcing portions are provided in the back chassis.

12 Claims, 24 Drawing Sheets

DISPLAY APPARATUS

CROSS-REFERENCE TO RELATED APPLICATION

The present application claims priority from Japanese Patent Application No. JP 2012-088755 filed in the Japanese Patent Office on Apr. 9, 2012, the entire content of which is incorporated herein by reference.

FIELD

The present technology relates to a technical field concerning a display apparatus. Particularly, the present technology relates to a technical field in which through holes piercing in a thickness direction are formed and reinforcing portions are provided in a back chassis to thereby reduce weight as well as to increase rigidity.

BACKGROUND

There is a display apparatus such as a television receiver and a personal computer, in which a display having a display surface on which images are displayed is provided, a back chassis is arranged on a back surface side of the display and a rear cover is attached on a back surface of the back chassis (for example, see JP-A-2010-243622 (Patent Document 1)).

Recently, a demand for reducing a thickness of the above display apparatus is increased. The thickness reduction is performed by reducing a thickness of the back chassis or the rear cover.

SUMMARY

It is possible to reduce the thickness and weight by reducing the thickness of the back chassis or the rear cover, however, it may be difficult to secure a stable setting state on a desk or the like as rigidity is reduced by reducing the thickness.

In view of the above, it is desirable to reduce weight as well as to increase rigidity while solving the above problems.

An embodiment of the present technology is directed to a display apparatus including a display displaying images on a display surface, a back chassis arranged in a position opposite to the display surface of the display, and a rear cover arranged in a position opposite to a surface of the back chassis which faces the display, in which through holes piercing in a thickness direction are formed in the back chassis and reinforcing portions are provided in the back chassis.

Accordingly, the back chassis is reduced in weight by the through holes as well as rigidity of the back chassis is increased by the reinforcing portions in the display apparatus.

In the display apparatus described above, it is preferable that an arrangement case is attached to the rear cover in a position opposite to a surface which faces the back chassis, and circuit substrates are housed in the arrangement case.

As the arrangement case is attached to the rear cover in the position opposite to the surface which faces the back chassis and the circuit substrates are housed in the arrangement case, the circuit substrates are disposed only in the portion to which the arrangement case is attached in the display apparatus.

In the display apparatus described above, it is preferable that speaker units are housed in the arrangement case.

As the speaker units are housed in the arrangement case, the speaker units are disposed only in the portion to which the arrangement case is attached in the display apparatus.

In the display apparatus described above, it is preferable that the arrangement case is attached to a lower end portion of the rear cover.

As the arrangement case is attached to the lower end portion of the rear cover, the center of gravity in the entire display apparatus is positioned on a lower side.

In the display apparatus described above, it is preferable that a frame is attached to an outer peripheral portion of the display and an outer peripheral portion of the back chassis, and the frame is provided with a first presser-surface portion pressing the outer peripheral portion of the display, a second presser-surface portion pressing the outer peripheral portion of the back chassis, which faces the first presser-surface portion and a coupling surface portion coupling the first presser-surface portion to the second presser-surface portion, which faces the outer peripheral portion of the display and the outer peripheral portion of the back chassis.

As the frame is provided with the first presser-surface portion pressing the outer peripheral portion of the display, the second presser-surface portion pressing the outer peripheral portion of the back chassis, which faces the first presser-surface portion and the coupling surface portion coupling the first presser-surface portion to the second presser-surface portion, which faces the outer peripheral portion of the display and the outer peripheral portion of the back chassis, the strength of the outer peripheral portion of the display apparatus is increased.

In the display apparatus described above, it is preferable that the frame is provided with a holding surface portion holding an outer peripheral portion of the rear cover.

As the frame is provided with the holding surface portion holding the outer peripheral portion of the rear cover, it is possible to prevent the rear cover from bending even when the rear cover is formed to be thin.

In the display apparatus described above, it is preferable that the reinforcing portions is formed by drawing processing.

As the reinforcing portions are formed by the drawing processing, the rigidity of the back chassis is increased by the simple structure.

In the display apparatus described above, it is preferable that the rear cover is formed by vacuum forming.

As the rear cover is formed by the vacuum forming, it is possible to form the rear cover to be thin.

In the display apparatus described above, it is preferable that an apparatus body having the display, the back chassis and the rear cover is provided, a stand having a receiving portion, which is attached to the apparatus body to support the apparatus body, is provided, and in a state where the stand is attached to the apparatus body, the receiving portion is positioned just below the display and the back chassis to allow the receiving portion to receive loads of the display and the back chassis.

As the receiving portion is positioned just below the display and the back chassis to allow the receiving portion to receive loads of the display and the back chassis in the state where the stand is attached to the apparatus body, the display apparatus is placed on a mounting surface such as a desk in a stable state.

In the display apparatus described above, it is preferable that an apparatus body having the display, the back chassis and the rear cover is provided, a stand attached to the apparatus body to support the apparatus body is provided, and the stand is attached to a lower end portion of the apparatus body to have a function of standing the apparatus body, and the stand is also attached to a back surface of the apparatus body to have a function of setting the apparatus body so as to abut on a wall surface.

As the stand is attached to the lower end portion of the apparatus body to have the function of standing the apparatus body and the stand is also attached to the back surface of the apparatus body to have the function of setting the apparatus body so as to abut on the wall surface, the apparatus body is set in different states by changing the position of attaching the stand with respect to the apparatus body.

The display apparatus according to the embodiment of the present technology includes the display displaying images on the display surface, the back chassis arranged in the position opposite to the display surface of the display, and the rear cover arranged in the position opposite to the surface of the back chassis which faces the display, in which through holes piercing in the thickness direction are formed in the back chassis and reinforcing portions are provided in the back chassis.

Therefore, as high rigidity can be secured by reinforcing portions provided in the back chassis, and further, the weight is reduced by the through holes in the back chassis, the weight can be reduced as well as the rigidity can be increased.

In one embodiment of the present technology, the arrangement case is attached to the rear cover in the position opposite to the surface which faces the back chassis, and the circuit substrates are housed in the arrangement case.

Therefore, the thickness of portions to which the arrangement case is not attached can be reduced.

In one embodiment of the present technology, the speaker units are housed in the arrangement case.

Therefore, the thickness of portions to which the arrangement case is not attached can be reduced.

In one embodiment of the present technology, the arrangement case is attached to a lower end portion of the rear cover.

Therefore, as the center of gravity in the entire display apparatus is positioned on the lower side, it is possible to secure a stable setting state of the display apparatus and to prevent the display apparatus from falling down due to the disturbance such as vibrations.

In one embodiment of the present technology, the frame is attached to an outer peripheral portion of the display and the outer peripheral portion of the back chassis, and the frame is provided with the first presser-surface portion pressing the outer peripheral portion of the display, the second presser-surface portion pressing the outer peripheral portion of the back chassis, which faces the first presser-surface portion and the coupling surface portion coupling the first presser-surface portion to the second presser-surface portion, which faces the outer peripheral portion of the display and the outer peripheral portion of the back chassis.

Therefore, the strength of the outer peripheral portion of the display apparatus can be increased by the frame and the rigidity of the display apparatus can be increased.

In one embodiment of the present technology, the frame is provided with the holding surface portion holding an outer peripheral portion of the rear cover.

Therefore, as it is possible to prevent the rear cover from bending even when the rear cover is formed to be thin, the thickness of the display apparatus can be reduced while preventing the bending of the rear cover.

In one embodiment of the present technology, the reinforcing portions are formed by the drawing processing.

Therefore, thickness reduction and high rigidity can be secured while securing the simple structure of the back chassis.

In one embodiment of the present technology, the rear cover is formed by the vacuum forming.

Therefore, it is possible to form the rear cover to be thin and to reduce the thickness of the display apparatus.

In one embodiment of the present technology, the apparatus body having the display, the back chassis and the rear cover is provided, the stand having the receiving portion, which is attached to the apparatus body to support the apparatus body, is provided, and in the state where the stand is attached to the apparatus body, the receiving portion is positioned just below the display and the back chassis to allow the receiving portion to receive loads of the display and the back chassis.

Therefore, it is possible to place the display apparatus on the mounting surface such as a desk in the stable state and to secure the stable setting state of the display apparatus.

In one embodiment of the present technology, the apparatus body having the display, the back chassis and the rear cover is provided, the stand attached to the apparatus body to support the apparatus body is provided, and the stand is attached to the lower end portion of the apparatus body to have the function of standing the apparatus body, and the stand is also attached to the back surface of the apparatus body to have the function of setting the apparatus body so as to abut on the wall surface.

Therefore, it is possible to set the apparatus body in a desired state by changing the position of attaching the stand with respect to the apparatus body, which can improve usability.

DETAILED DESCRIPTION

Hereinafter, a display apparatus according to an embodiment of the present technology will be explained with reference to attached drawings.

The display apparatus according to the embodiment of the present technology shown below is applied to a television receiver displaying images on a liquid crystal panel functioning as a display.

The application range of the present technology is not limited to the television receiver using the liquid crystal panel as the display but the present technology can be widely applied to various types of display apparatuses such as other various types of television receivers in any kind of display and monitors used for a personal computer and so on.

[Structure of Display Apparatus]

A display apparatus (television receiver) 1 is provided with an apparatus body 2 which is formed in a landscape, flat and approximately rectangular shape, and the apparatus body 2 includes a back chassis 3, a display 4 and a rear cover 5 (refer to FIG. 1 to FIG. 4).

The back chassis 3 is made of an iron material, which is formed in a landscape, rectangular and approximately flat-plate shape facing the front and back, having a thickness of, for example, 0.5 mm. As the iron material is relatively lower in price than other metal materials, it is possible to reduce manufacturing costs when the back chassis 3 is formed by using the iron material.

Figure 5:
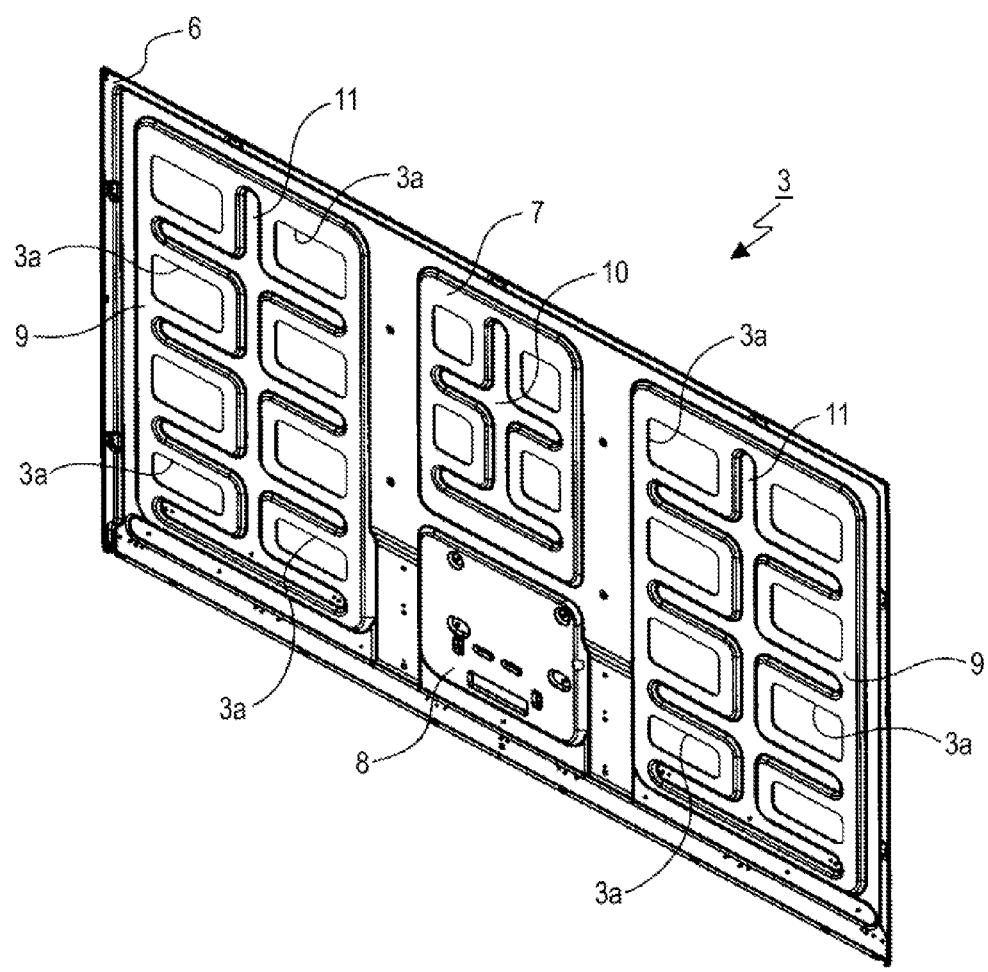
FIG. 5 is a perspective view of a back chassis.
Figure 6:
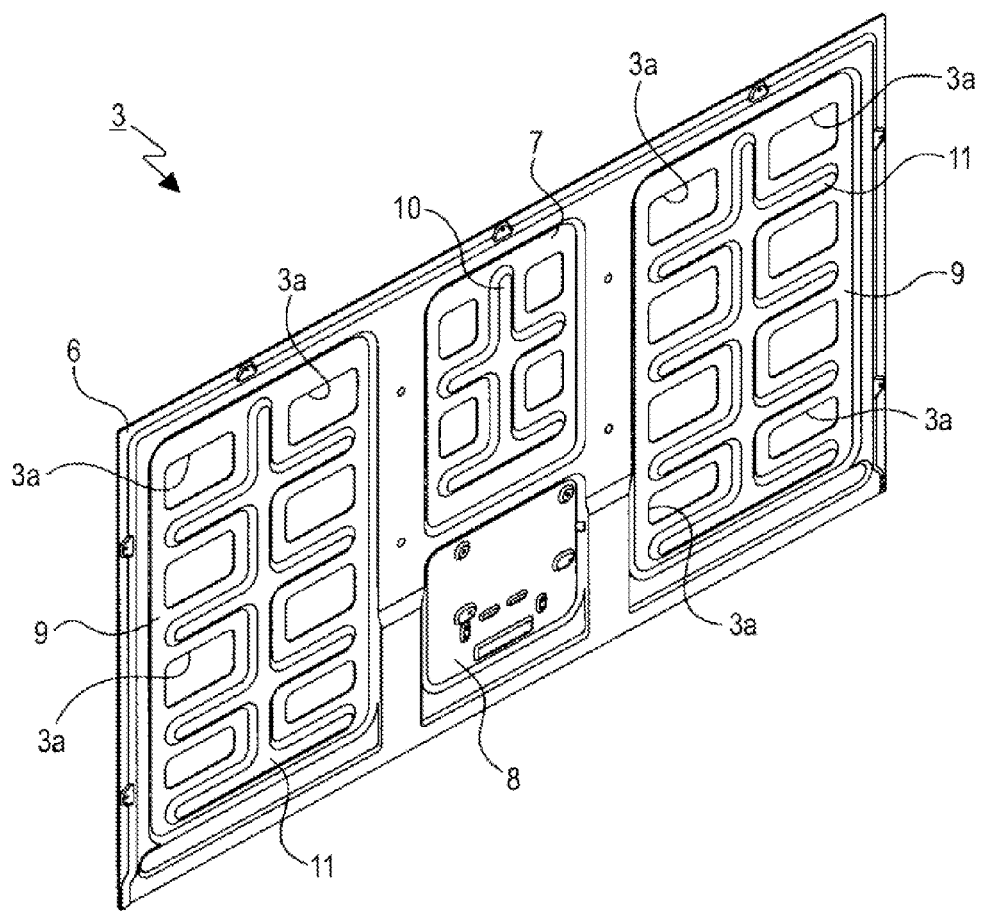
FIG. 6 is a perspective view of the back chassis shown in a state seen from the opposite side of FIG. 5.

An outer peripheral portion other than a lower end portion in the back chassis 3 is provided as a first reinforcing portion 6 protruding forward as compared with an inner portion of the back chassis 3 (refer to FIG. 5 and FIG. 6).

In the back chassis 3, second reinforcing portions 7, 8, 9 and 9 having a portrait and approximately rectangular shape protruding forward are respectively provided at positions of a center portion in right and left directions and both sides of right and left. The second reinforcing portions 7 and 8 are provided in the center portion of the back chassis 3 apart from each other in a vertical direction, while the second reinforcing portions 9 and 9 are provided on right and left of the second reinforcing portions 7 and 8 respectively.

In the back chassis 3, plural through holes 3a, 3a, . . . piercing in front and back directions are respectively formed at areas where the second reinforcing portions 7, 9 and 9 are provided. The through holes 3a, 3a, . . . are positioned, for example, at equal intervals.

In the back chassis 3, third reinforcing portions 10, 11 and 11 protruding backward are respectively provided at the areas where the second reinforcing portions 7, 9 and 9 are provided. The third reinforcing portions 10, 11 and 11 are formed so that portions extending vertically and portions extending horizontally cross each other, which are positioned between the through holes 3a, 3a, . . . or under the through holes 3a, 3a, . . . .

The first reinforcing portion 6, the second reinforcing portions 7, 8, 9, 9 and the third reinforcing portions 10, 11, 11 are formed by, for example, drawing processing.

It is possible to reduce a thickness and to secure high rigidity while maintaining a simple structure of the back chassis 3 by forming the first reinforcing portion 6, the second reinforcing portions 7, 8, 9, 9 and the third reinforcing portions 10, 11, 11 by the drawing processing.

Figure 3:
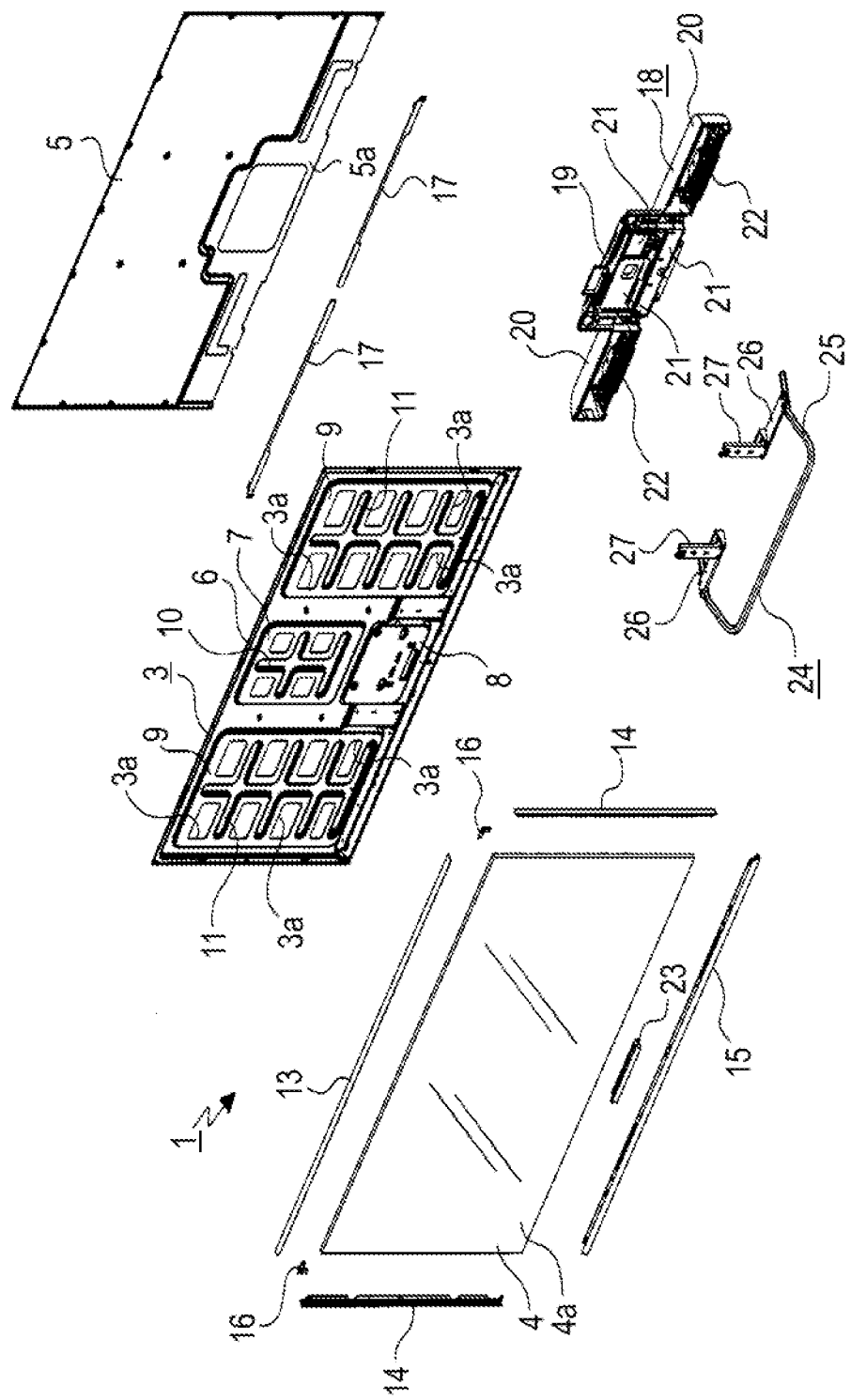
FIG. 3 is an exploded perspective view of the display apparatus.
Figure 4:
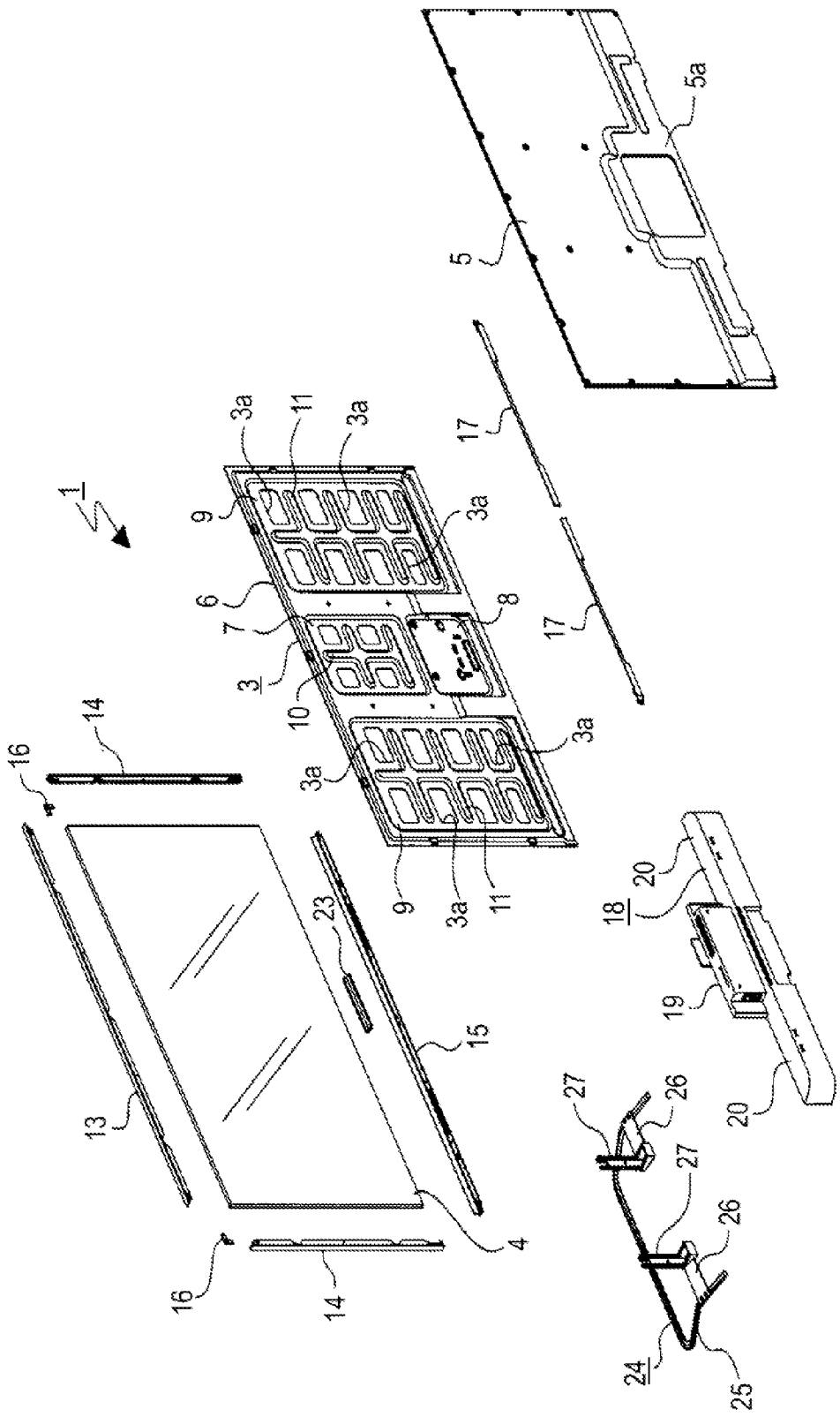
FIG. 4 is an exploded perspective view of the display apparatus seen from the opposite side of FIG. 3.

The display 4 is, for example, a liquid crystal display, which is formed in a landscape rectangular shape having approximately the same size as the back chassis 3 (refer to FIG. 3 and FIG. 4). The display 4 has a display surface 4a as a front surface, including a pair of transparent plates arranged in the front and back, polarization films and so on.

The display 4 is arranged on the front side of the back chassis 3, in which various components for displaying images such as transparent electrodes, liquid crystal, alignment films and color filters are arranged.

Figure 7:
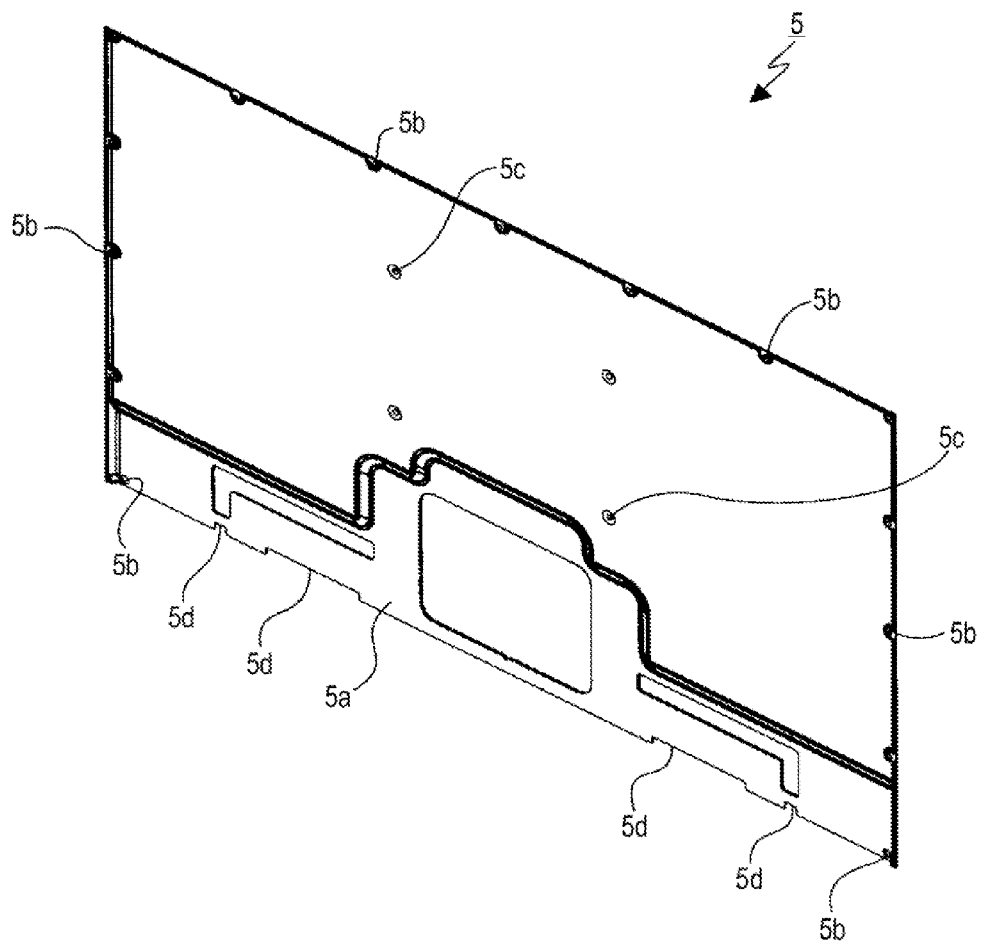
FIG. 7 is a perspective view of a rear cover.
Figure 8:
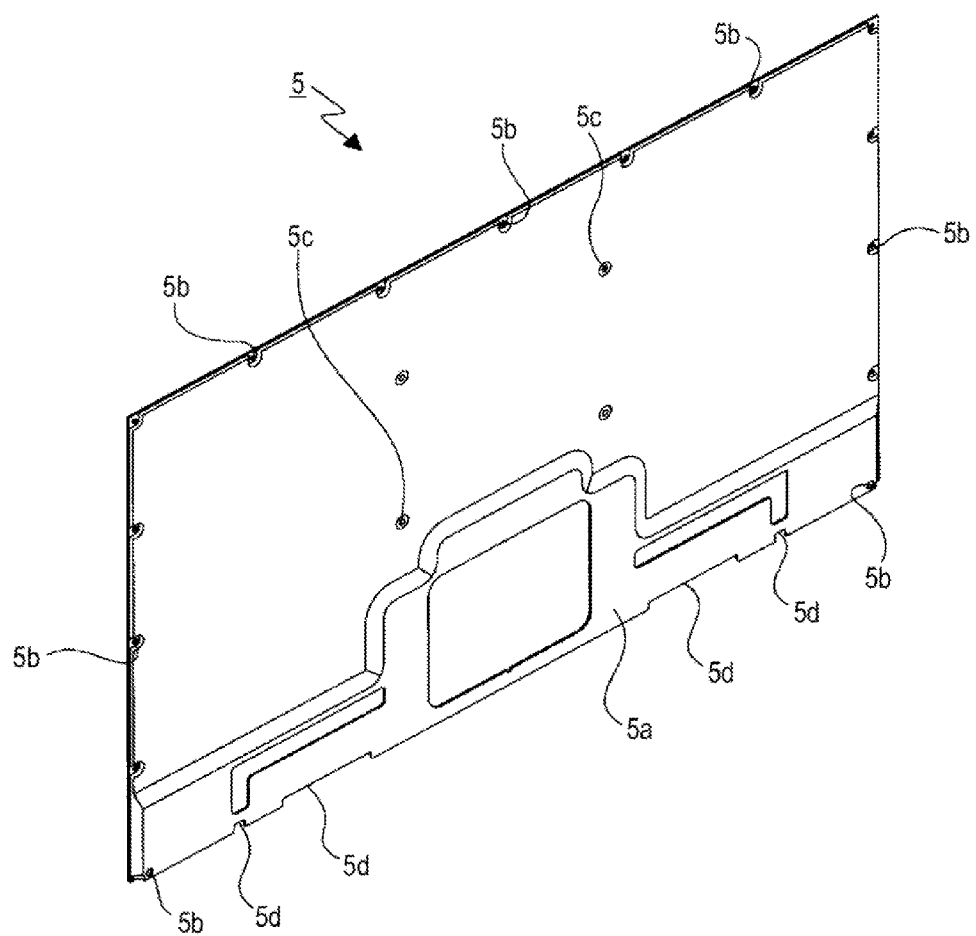
FIG. 8 is a perspective view of the rear cover shown in a state seen from the opposite side of FIG. 7.

The rear cover 5 is formed to have a landscape rectangular shape having approximately the same size as the back chassis 3 (refer to FIG. 7 and FIG. 8) so as to have a thickness of, for example, approximately 1 mm by vacuum forming.

The rear cover 5 can be formed to be thin by forming the rear cover 5 by the vacuum forming, which reduces the thickness of the display apparatus 1.

The rear cover 5 is made of, for example, polystyrene (PS), a mixed material of polystyrene and polyphenyleneether (PPE), a copolymer of polycarbonate/Acrylonitrile Butadiene Styrene (ABS) and so on.

A portion in a lower end side of the rear cover 5 is formed as a protruding portion 5a protruding backward as compared with other portions.

Figure 9:
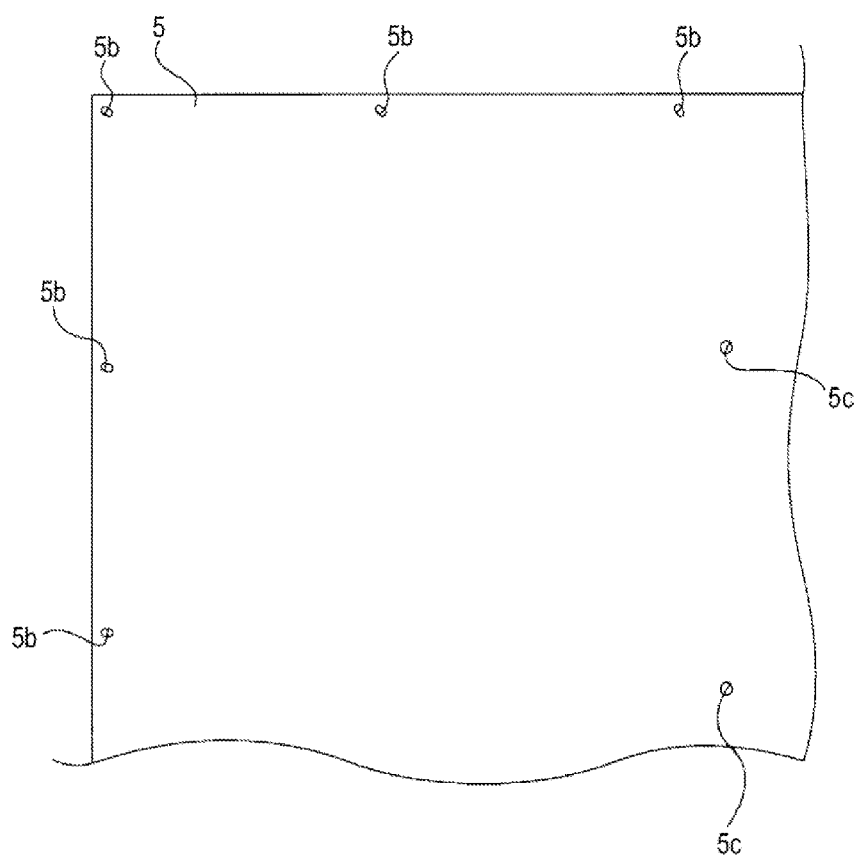
FIG. 9 is a schematic rear view of the back chassis.

In an outer peripheral portion other than the lower end portion in the rear cover 5, first screw insertion holes 5b, 5b, . . . are formed at intervals in a circumferential direction. The first screw insertion holes 5b, 5b, . . . are formed in a long-hole shape extending toward a center portion of the rear cover 5 (refer to FIG. 9).

Second screw insertion holes 5c, 5c, . . . having a circular shape are formed in portions close to the center of the rear cover 5.

Insertion notches 5d, 5d, . . . opening downward are formed at the lower end portion of the rear cover 5 apart from one another in the right and left directions.

The rear cover 5 is disposed in a state of touching a back surface of the back chassis 3. As the rear cover 5 is disposed in the state of touching the back surface of the back chassis 3, the leakage of light from the through holes 3a, 3a, . . . formed in the back chassis 3 can be prevented by the rear cover 5.

A frame 12 is attached to outer peripheral portions of the back chassis 3 and the display 4 (refer to FIG. 1 to FIG. 4).

Figure 10:
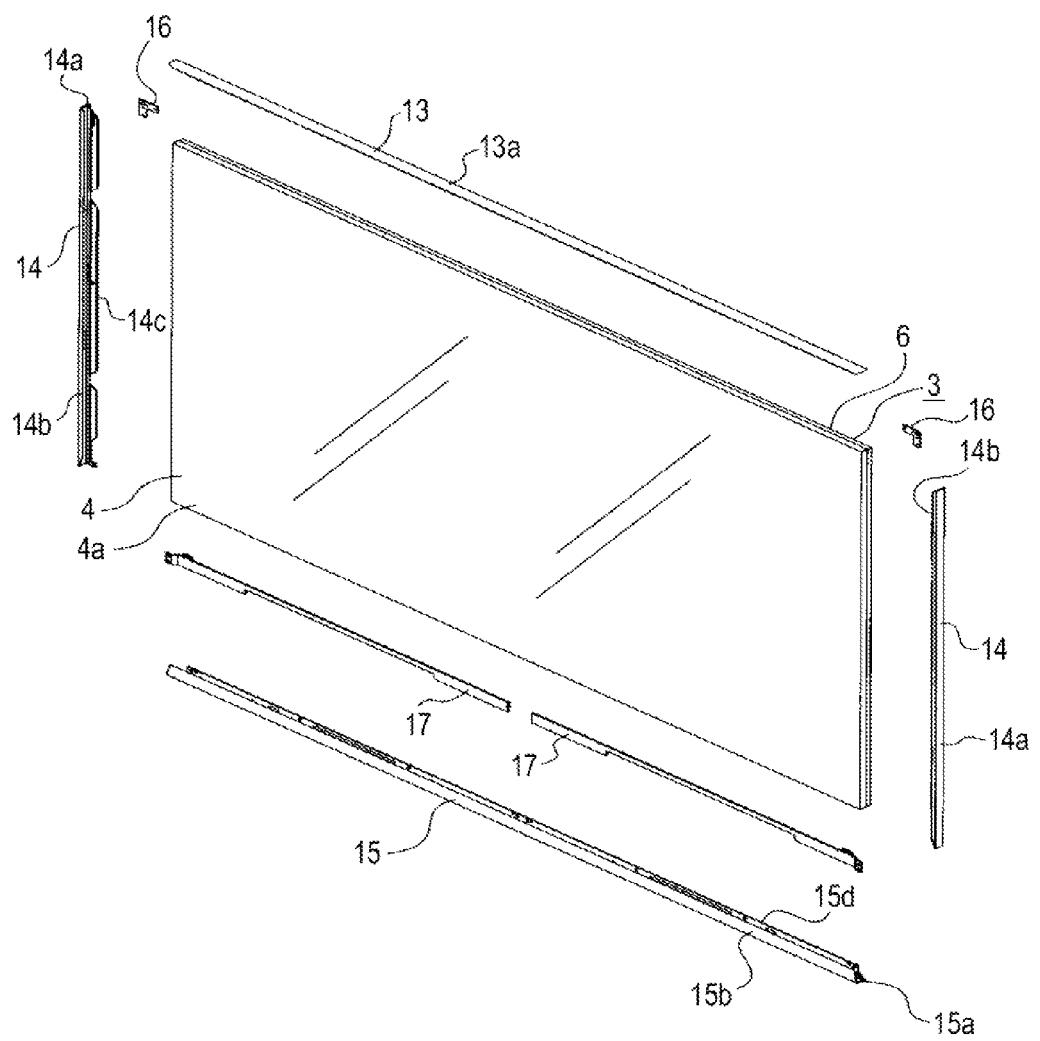
FIG. 10 is an exploded perspective view of a display, the back chassis and a frame.
Figure 11:
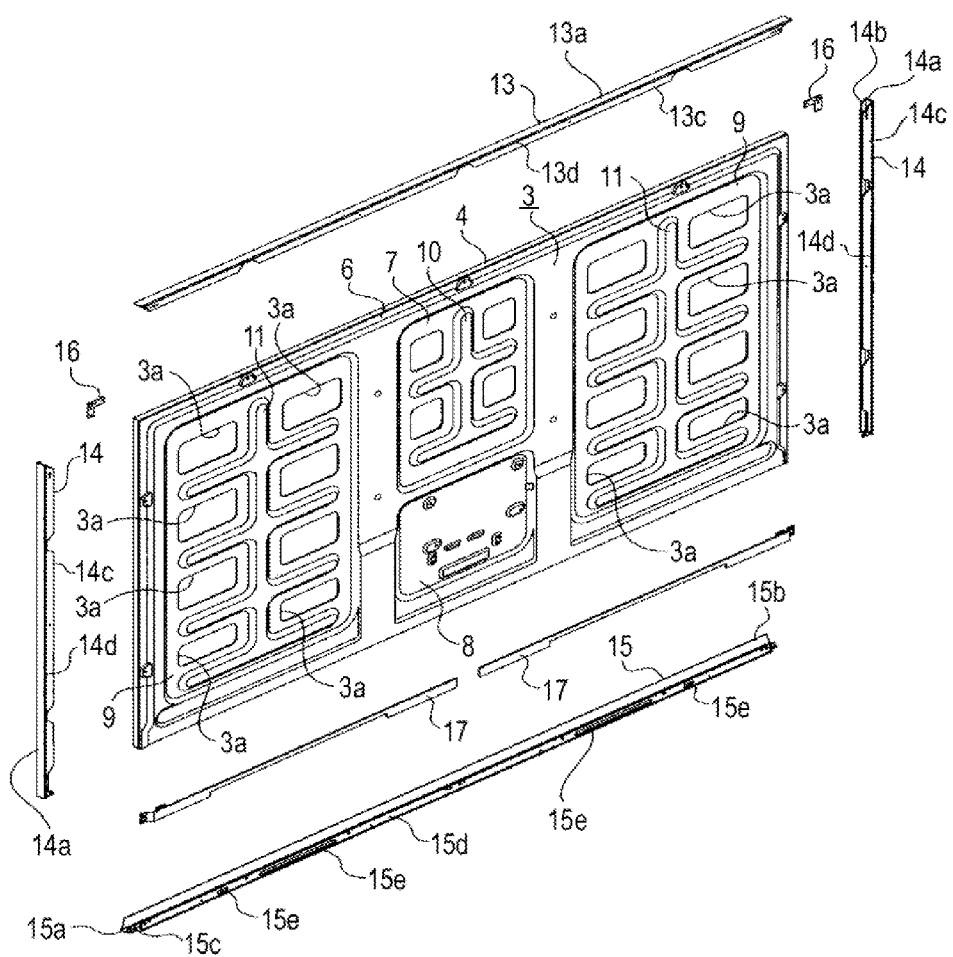
FIG. 11 an exploded perspective view of the display, the back chassis and the frame seen from the opposite side of FIG. 10.
Figure 12:
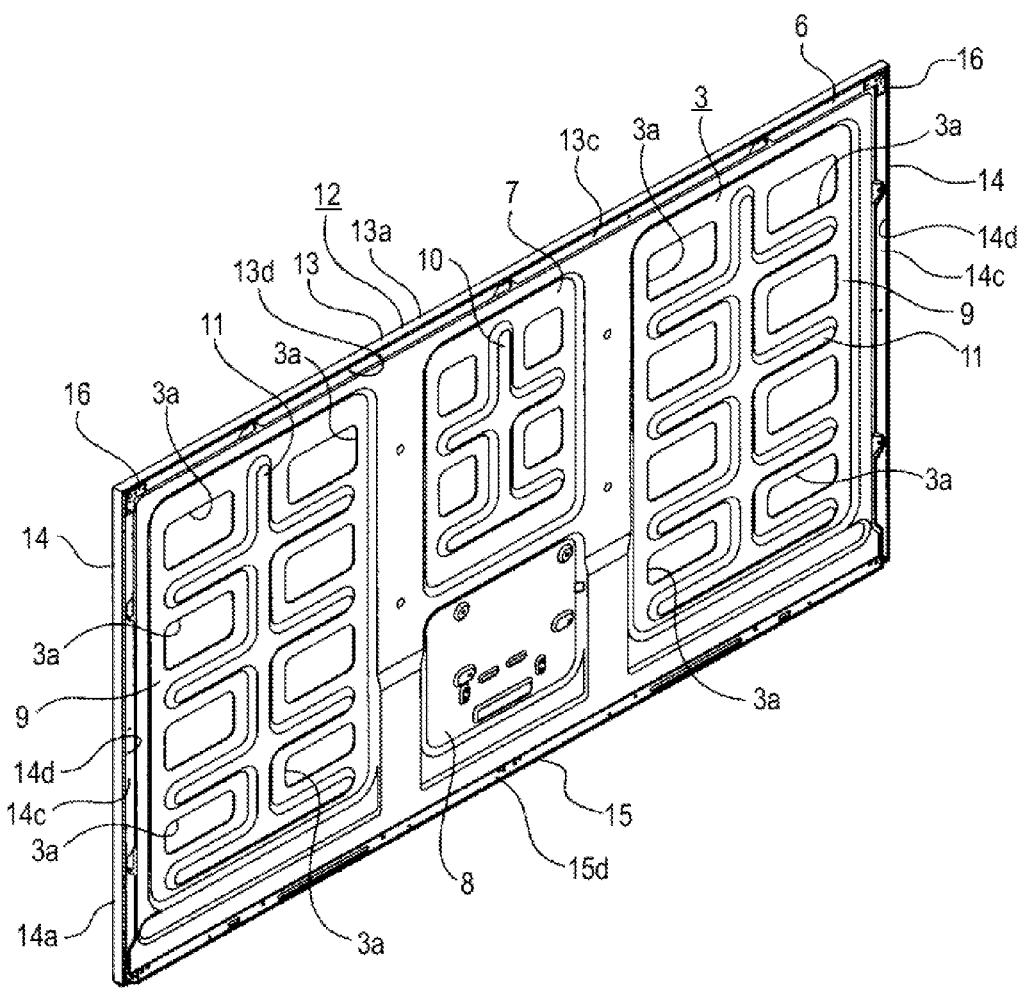
FIG. 12 is a perspective view showing a state where the frame is attached to outer peripheral portions of the back chassis and the display.

The frame 12 is formed by, for example, connecting an upper frame portion 13 extending in the right and left directions, side frame portions 14, 14 extending in upper and lower directions and a lower frame portion 15 extending in the right and left directions in a frame shape (refer to FIG. 10 to FIG. 12). The upper frame portion 13, the side frame portions 14, 14 and the lower frame portion 15 are made of, for example, aluminum.

Figure 13:
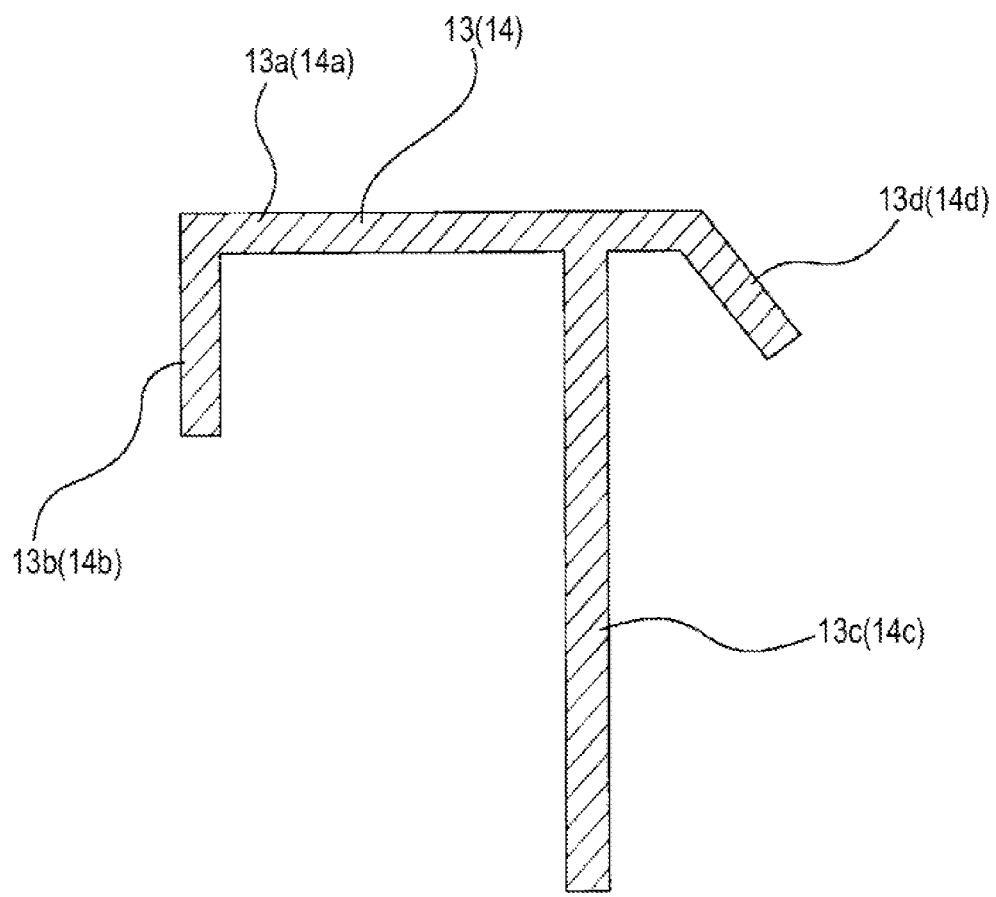
FIG. 13 is a schematic enlarged cross-sectional view showing frame portions of the frame.

The upper frame portion 13 includes a coupling surface portion 13a facing the upper and lower directions, a first presser-surface portion 13b protruding downward from a front edge of the coupling surface portion 13a, a second presser-surface portion 13c protruding downward from a rear edge of the coupling surface portion 13a and a holding surface portion 13d protruding obliquely downward from the rear edge of the coupling surface portion 13a, which are integrally formed as shown in FIG. 13.

The side frame portion 14 includes a coupling surface portion 14a facing the right and left directions, a first presser-surface portion 14b protruding from a front edge of the coupling surface portion 14a to a lateral direction (inward), a second presser-surface portion 14c protruding from a rear edge of the coupling surface portion 14a to the lateral direction (inward) and a holding surface portion 14d protruding from the rear edge of the coupling surface portion 14a to an oblique lateral direction, which are integrally formed.

Figure 14:
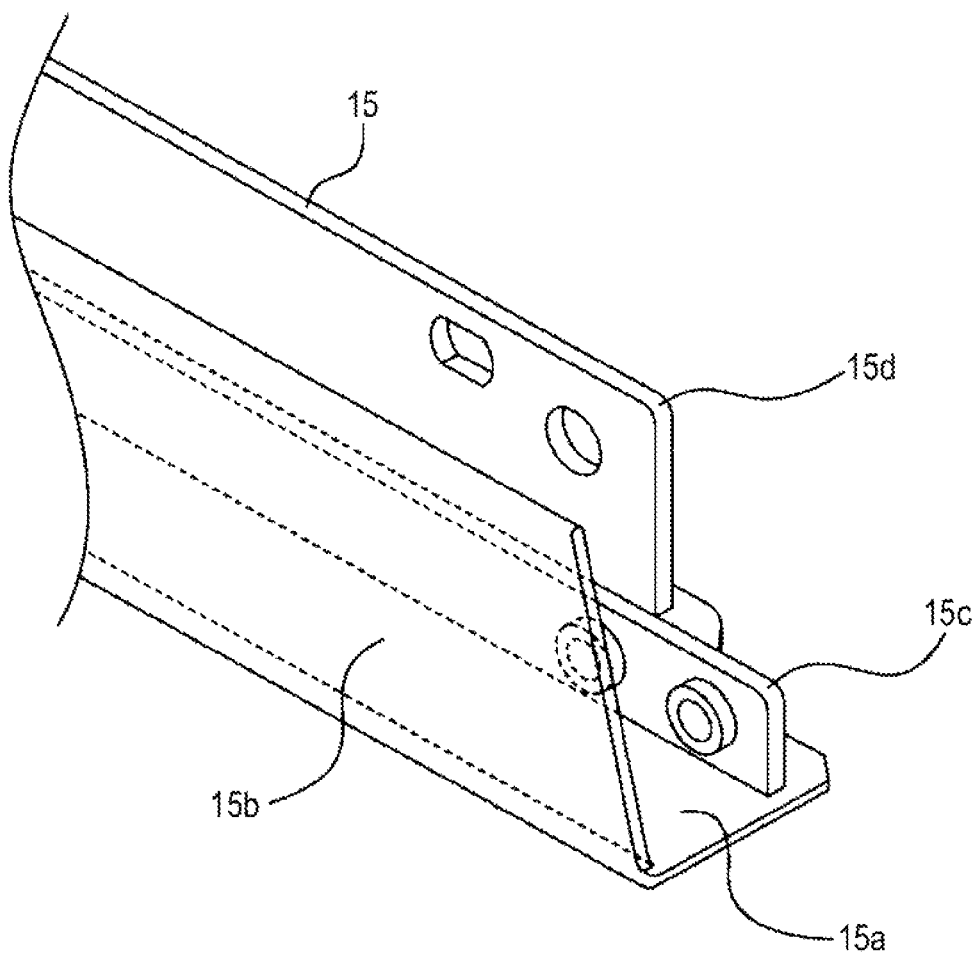
FIG. 14 is an enlarged perspective view showing part of a lower frame portion of the frame.

The lower frame portion 15 includes a coupling surface portion 15a facing the upper and lower directions, a first presser-surface portion 15b protruding upward from a front edge of the coupling surface portion 15a, a second presser-surface portion 15c protruding upward from an intermediate portion of the coupling surface portion 15a in the front and back direction and a connecting surface portion 15d protruding upward from a rear edge of the coupling surface portion 15a, which are integrally formed as shown in FIG. 14.

Engaging holes 15e, 15e, . . . extending in the right and left directions are formed in the connecting surface portion 15d of the lower frame portion 15 apart from one another in the right and left directions.

The outer peripheral portions of the back chassis 3 and the display 4 are inserted between the first presser-surface portion 13b and the second presser-surface portion 13c of the upper frame portion 13, between the first presser-surface portions 14b, 14b and the second presser-surface portions 14c, 14c of the side frame portions 14, 14 and between the first presser-surface portion 15b and the second presser-surface portion 15c of the lower frame portion 15 to be held by the frame 12 (refer to FIG. 12).

As described above, the outer peripheral portion of the back chassis 3 and the outer peripheral portion of the display 4 are held by the frame 12 which is formed in a C-shape in cross section by the coupling surface portions 13a, 14a, 14a and 15a, the first presser-surface portion 13b, 14b, 14b and 15b/and the second presser-surface portion 13c, 14c, 14c and 15c.

Therefore, the frame 12 increases the strength of the outer peripheral portion of the display apparatus 1, which improves the rigidity of the display apparatus 1.

Figure 15:
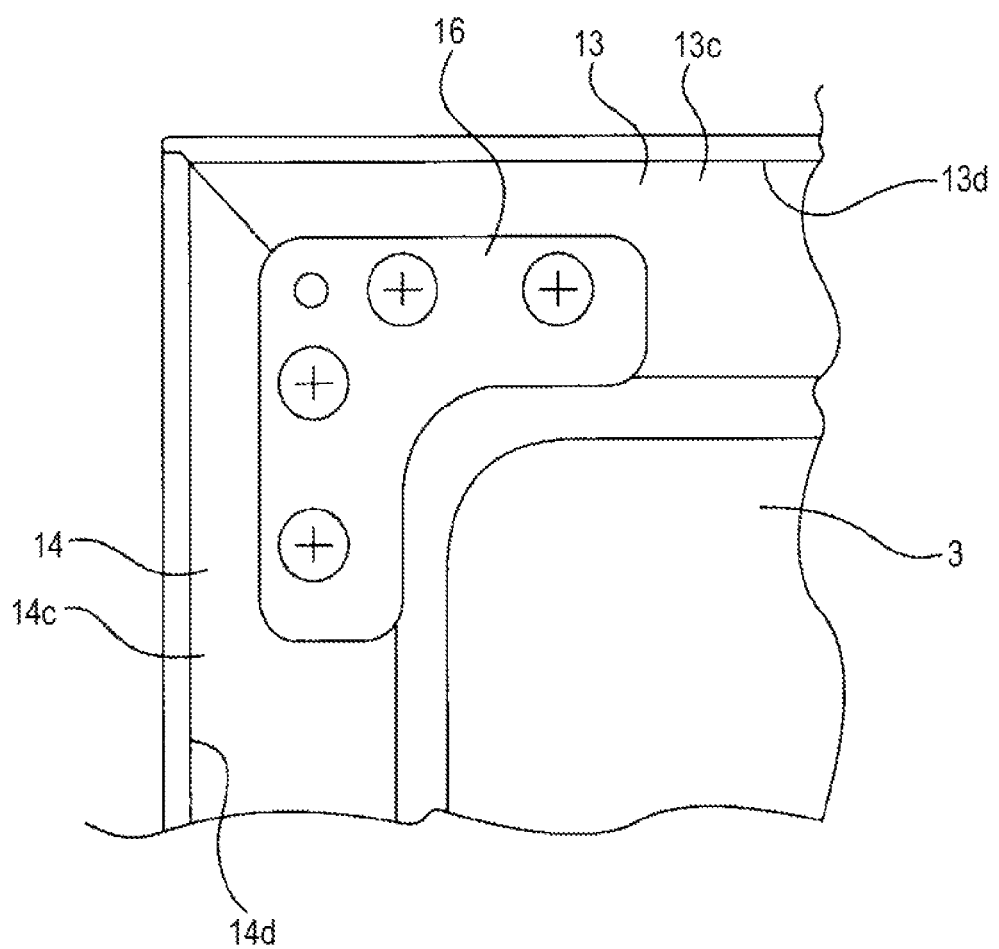
FIG. 15 is an enlarged rear view showing a state where an upper frame portion is connected to a side frame portion of the frame.
Figure 16:
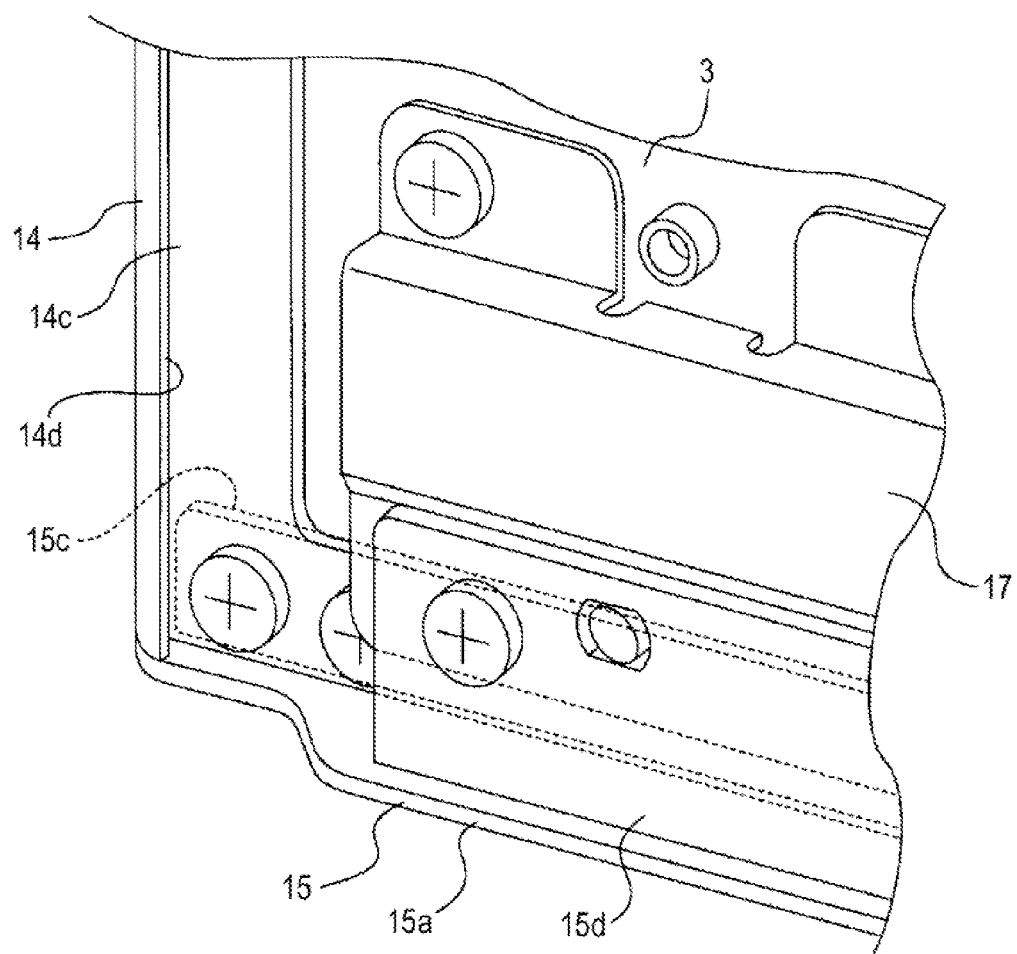
FIG. 16 is an enlarged perspective view showing a state where the lower frame portion is connected to the side frame portion of the frame and where the back chassis is connected to the lower frame portion.

In a state where the back chassis 3 and the display 4 are held by the frame 12, both end portions in right and left of the second presser-surface portion 13c of the upper frame portion 13 and upper end portions of the second presser-surface portions 14c, 14c of the side frame portions 14, 14 are respectively connected by screw clamping and so on through, for example, L-shaped connecting plates 16, 16 (refer to FIG. 15). Lower end portions of the second presser-surface portions 14c, 14c of the side frame portions 14, 14 and both end portions in right and left of the second presser-surface portions 15c, 15c of the lower end portions 15, 15 are respectively connected by screw clamping and so on (refer to FIG. 16).

In the state where the back chassis 3 and the display 4 are held by the frame 12, the lower end portion of the back chassis 3 and connecting surface portion 15d of the lower frame portions 15, 15 are connected by, for example, screw clamping and so on through reinforcing plates 17, 17.

The reinforcing plates 17, 17 are formed in a shape extending in right and left directions apart from each other in right and left directions.

Figure 17:
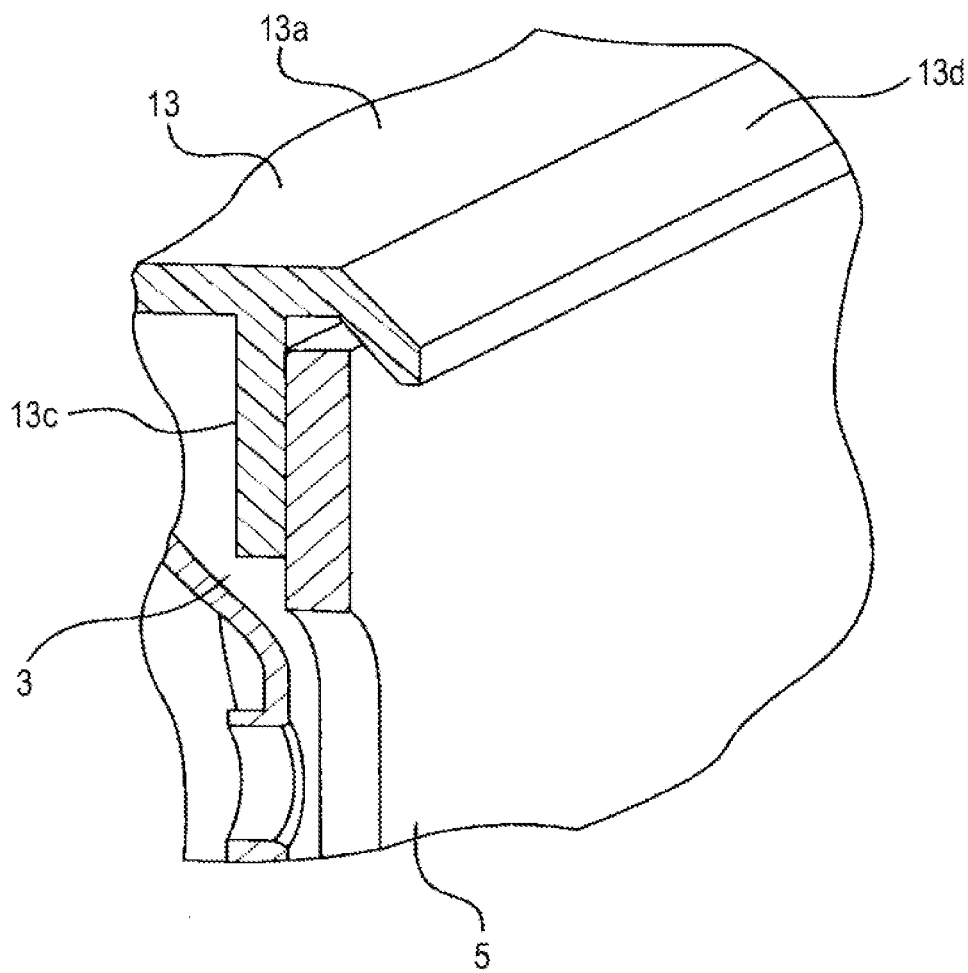
FIG. 17 is an enlarged perspective view showing a state where an outer peripheral portion of the rear cover is held by the frame.

In the outer peripheral portion of the rear cover 5, an upper end portion is inserted between the second presser-surface portion 13c and the holding surface portion 13d of the upper frame portion 13 to be held, and both end portions in right and left are respectively inserted between the second presser-surface portions 14c, 14c and the holding surface portions 14d, 14d of the side frame portions 14, 14 to be held (refer to FIG. 17).

As the holding surface portion 13d, 14d and 14d holding the outer peripheral portion of the rear cover 5 are respectively provided in the upper frame portion 13 and the side frame portions 14, 14 in the frame 12 as described above, it is possible to prevent the rear cover 5 from bending even when the rear cover 5 is formed to be thin, therefore, the thickness of the display apparatus 1 can be reduced while preventing the bending of the rear cover 5.

When the rear cover 5 is formed by vacuum forming, an outer peripheral surface of the rear cover 5 is formed as a fracture surface for performing cutting by press working for forming an outer shape.

However, the outer peripheral portion of the rear cover 5 is inserted between the second presser-surface portions 13c, 14c, 14c and the holding surface portions 13d, 14d, 14d, thereby closing the outer peripheral portion of the rear cover 5 by the upper frame portion 13 and the side frame portions 14, 14 and concealing the fracture surface of the rear cover 5.

Figure 18:
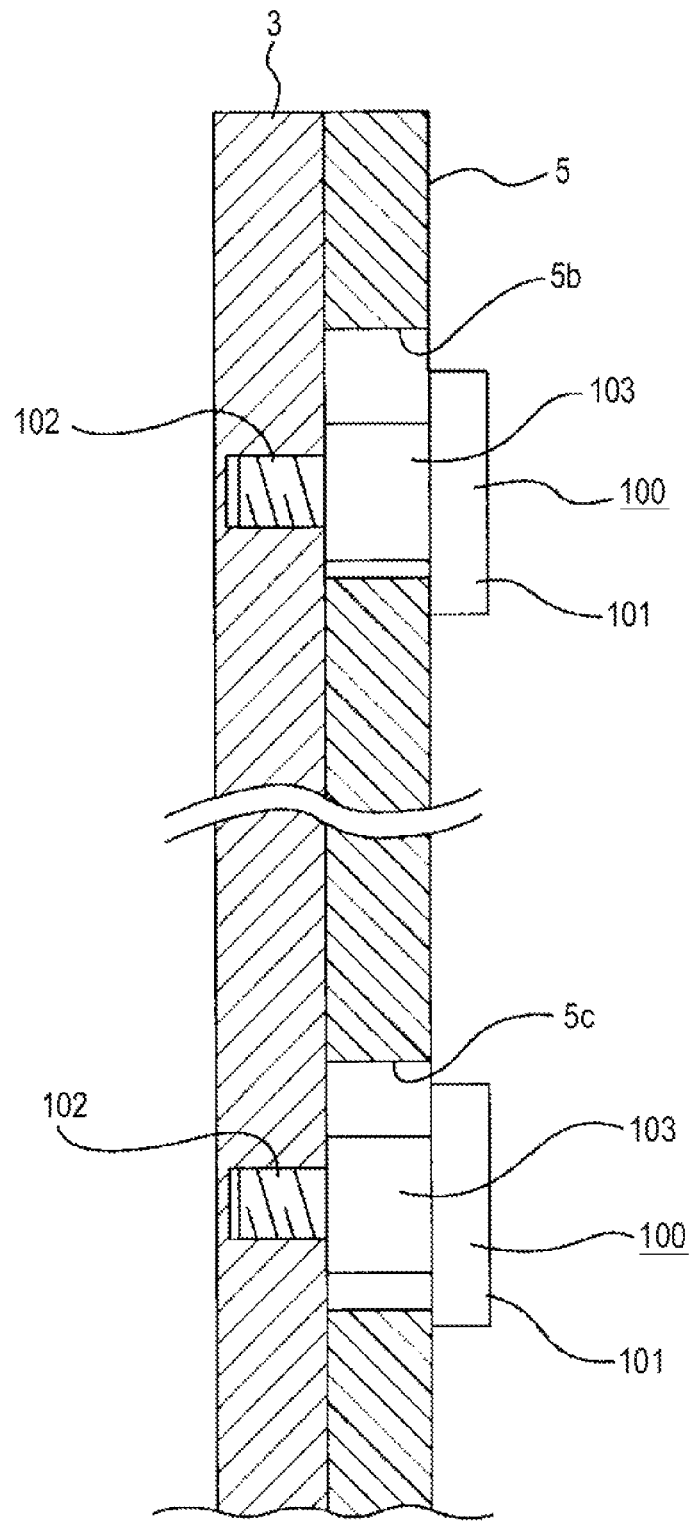
FIG. 18 is a schematic cross-sectional view showing a state where the rear cover is pressed against the back chassis by stepped screws.

Stepped screws 100, 100, . . . are inserted into the screw insertion holes 5b, 5b, . . . formed at the outer peripheral portion other than the lower end portion in the rear cover 5 and the second screw insertion holes 5c, 5c, . . . formed in the center portion of the rear cover 5 to be screwed into the back chassis 3 or the frame 12, as a result, the rear cover 5 is pressed against the back chassis 3 (refer to FIG. 18).

At this time, a stepped portion 103 provided between a head portion 101 and a screw portion 102 of the stepped screw 100 is inserted into the first insertion hole 5b. As described above, the screw insertion holes 5b, 5b, . . . are formed in the long hole shape extending toward the center portion of the rear cover 5, therefore, the rear cover 5 is displaced (moved) with respect to the stepped screw 100 even when slight expansion and contraction occur in the rear cover 5 after forming. Accordingly, the rear cover 5 is pressed against the back chassis 3 in a good condition without occurrence of distortion and deformation in the rear cover 5.

The stepped portion 103 of the stepped screw 100 is also inserted into the second screw insertion hole 5c. The size of the second screw insertion hole 5c is formed to be larger than the stepped portion 103, therefore, the rear cover 5 is displaced (moved) with respect to the stepped screw 100 even when slight expansion and contraction occur in the rear cover 5 after forming. Accordingly, the rear cover 5 is pressed against the back chassis 3 in a good condition without occurrence of distortion and deformation in the rear cover 5.

Figure 19:
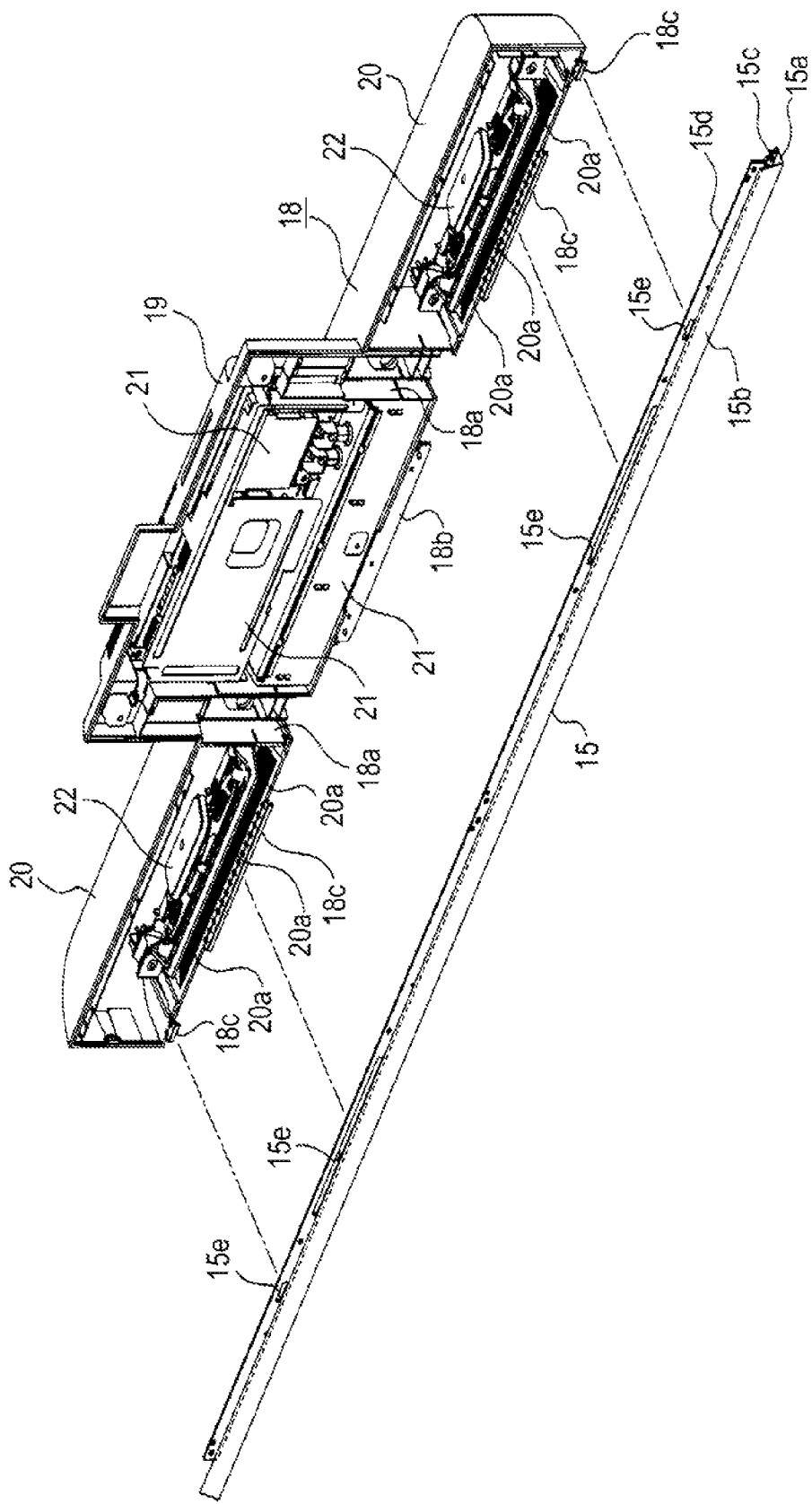
FIG. 19 is a perspective view showing an arrangement case, respective components housed inside the arrangement case and the lower frame portion.
Figure 20:
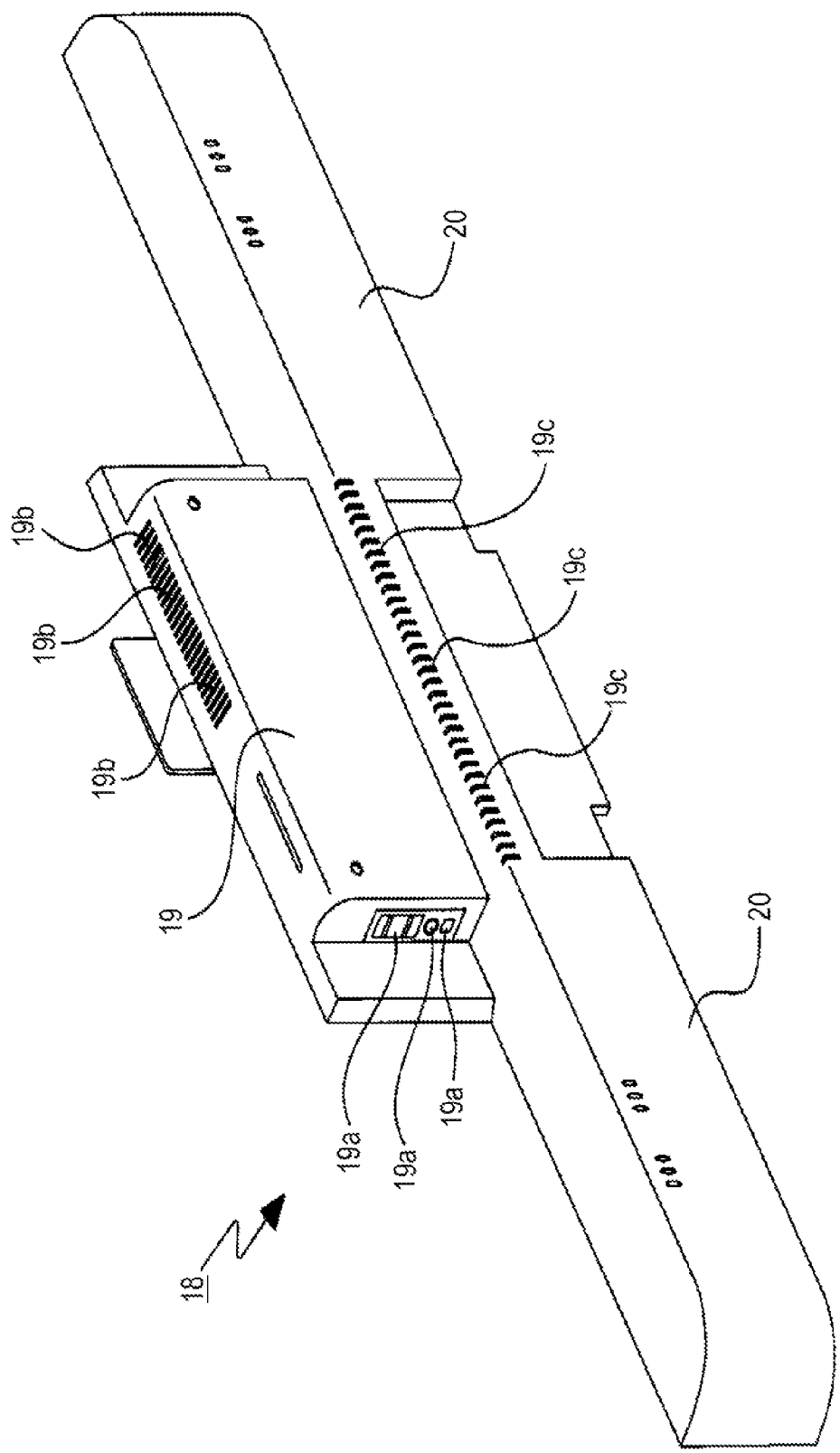
FIG. 20 is a perspective view of the arrangement case shown in a state seen from the opposite side of FIG. 19.
Figure 21:
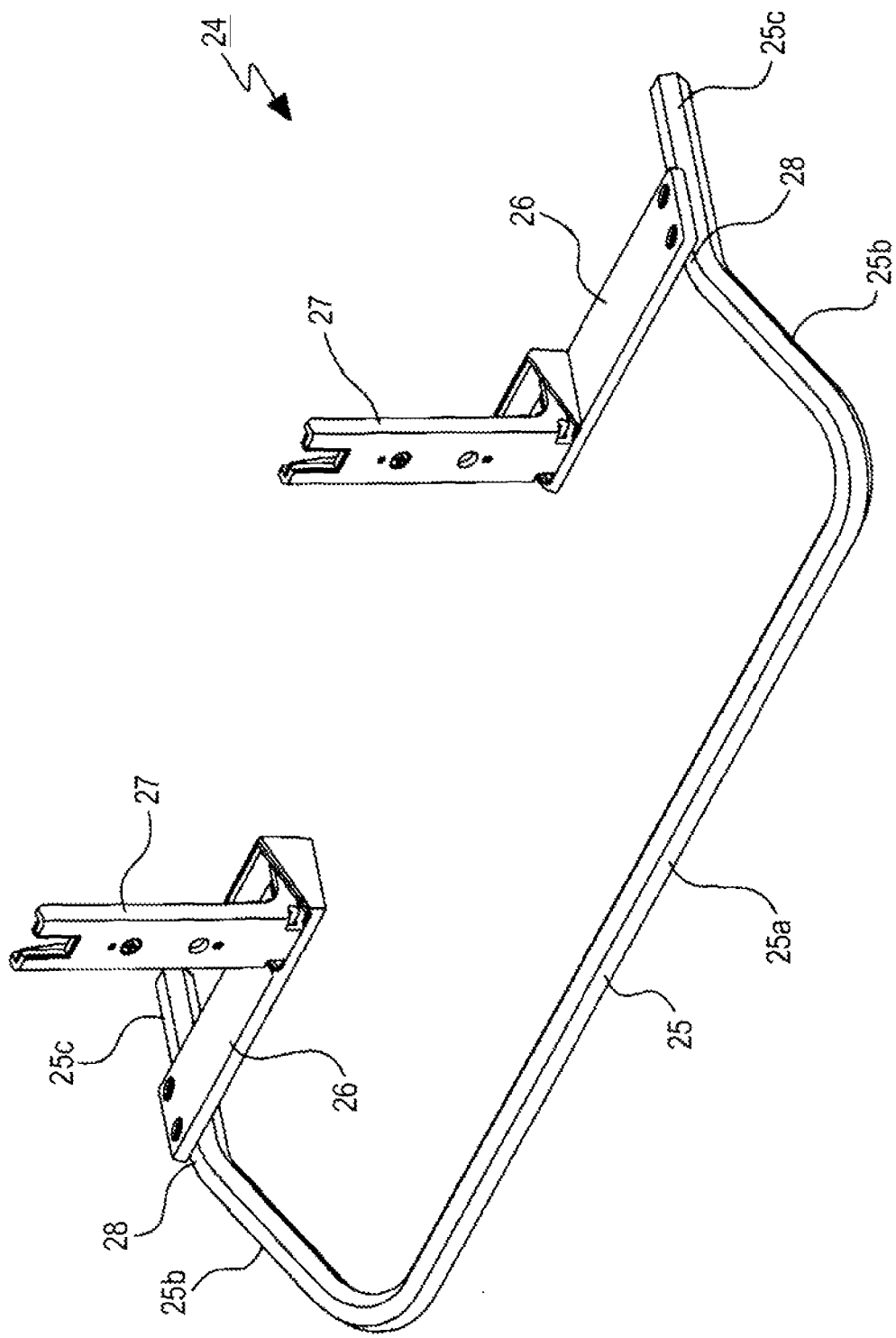
FIG. 21 is a perspective view of a stand.

An arrangement case 18 is attached on a back surface side in the lower end portion of the rear cover 5. The arrangement case 18 is made of a resin material, including a substrate arrangement portion 19 and speaker arrangement portions 20, 20 provided so as to protrude in lateral directions respectively from a lower half portion of the substrate arrangement portion 19 (refer to FIG. 19 and FIG. 20.

In the substrate arrangement portion 19, not-shown plural circuit substrates, attachment members 21, 21, . . . to which these circuit substrates are attached and so on are housed and arranged.

As the circuit substrates, for example, a circuit substrate for driving a light source which drives the light source (light emitting diode) functioning as a backlight, a circuit substrate for outputting images which outputs images to the display 4, a circuit substrate for control which performs drive control of the display 4 and other circuit substrates are provided. These circuit substrates are connected to a not-shown drive circuit portion and so on respectively arranged at the lower end portion of the display 4 by a not-shown wiring plate such as a flexible printed wiring plate.

These circuit substrates are arranged in a state of facing, for example, the front and back directions. Accordingly, the thickness of the arrangement case 18 in the front and back directions can be reduced, which reduces the thickness of the display apparatus 1.

Connectors 19a, 19a, . . . are provided on a side surface of the substrate arrangement portion 19. The connectors 19a, 19a, . . . are connected to the above circuit substrates, and various types of cables are connected to the connectors 19a, 19a, . . . from the outside. Louvers 19b, 19b, . . . are formed on an upper surface of the substrate arrangement portion 19 and air intake vents 19c, 19c, . . . are formed in a position below the louvers 19b, 19b, . . . .

At the time of driving the circuit substrates and so on, cooling air is taken into the substrate arrangement portion 19 from the air intake vents 19c, 19c, . . . , and the temperature of the taken cooling air is increased and the air is discharged outside from the louvers 19b, 19b, . . . . Therefore, the temperature increase inside the substrate arrangement portion 19 at the time of driving the circuit substrates can be suppressed.

In the speaker arrangement portions 20, 20, speaker units 22, 22 are respectively housed and arranged. On a lower surface of the speaker arrangement portions 20, 20, sound releasing holes 20a, 20a, . . . are respectively formed. Sound outputted from the speaker units 22, 22 is outputted from the sound releasing holes 20a, 20a, . . . respectively.

Concave portions for arrangement 18a, 18a are formed at positions of both ends in right and left of the substrate arrangement 19 in the arrangement case 18. The concave portions for arrangement 18a, 18a open forward and downward.

An attachment portion 18b protruding downward is provided at a center portion of a lower end portion of the arrangement case 18 in the right and left directions.

In the lower end portion of the arrangement case 18, engagement pieces 18d, 18c, . . . are provided apart from one another in the right and left directions. The engagement pieces 18d, 18c, . . . protrude forward, which are formed to have an L-shape in cross section.

The arrangement case 18 is attached to the lower end portion in the back surface of the rear cover 5 by screw clamping and so on in a state where the engagement pieces 18d, 18c, . . . are respectively inserted into the engaging holes 15e, 15e, . . . formed in the connecting surface portion 15d of the lower frame portion 15 and engaged. At this time, the engagement pieces 18d, 18c, . . . are respectively inserted into the insertion notches 5d, 5d, . . . of the rear cover 5.

The attachment of the arrangement case 18 is performed by, for example, a not-shown attachment screw inserted into a screw insertion hole of the arrangement case 18 being inserted into part of the rear cover 5 and being screwed into the back chassis 3.

In the state where the arrangement case 18 is attached, part of the lower end portion of the rear cover 5 is held from a backward direction by the arrangement case 18. Accordingly, curvature and deformation in the lower end portion of the rear cover 5 can be prevented. Moreover, it is not necessary to press the part of the lower end portion of the rear cover 5 against the back chassis 3 by screw clamping and the like, which improves workability in assembly work of the display apparatus 1.

Figure 1:
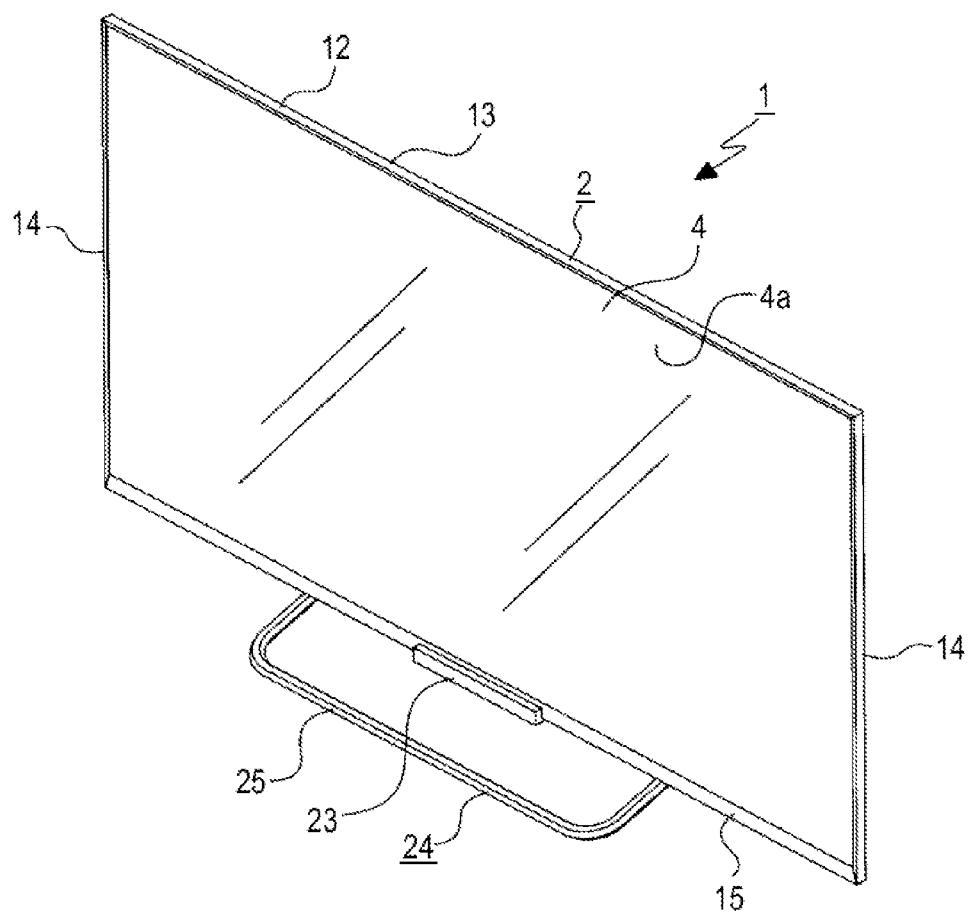
FIG. 1 shows a display apparatus according to an embodiment of the present technology together with FIG. 2 to FIG. 24, which is a perspective view of the display apparatus.
Figure 2:
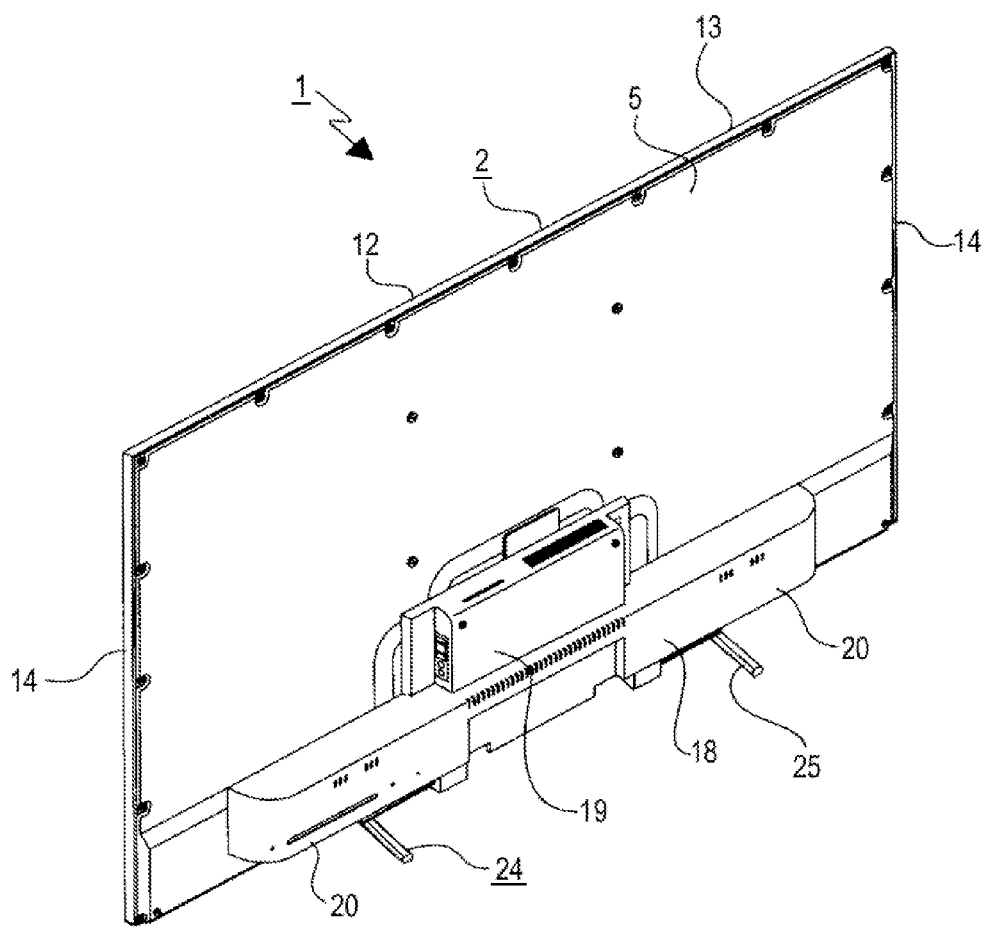
FIG. 2 is a perspective view of the display apparatus shown in a state seen from the opposite side of FIG. 1.

In the state where the arrangement case 18 is attached as described above, the attachment portion 18b is positioned in a state of protruding below the back chassis 3, and a communication box 23 is attached to the attachment portion 18b (refer to FIG. 1). A not-shown substrate for wireless communication is arranged in the communication box 23, which enables, for example, transmission/reception of signals between a not-shown remote control device and the display apparatus 1.

As described above, the arrangement case 18 is attached in a position opposite to a surface of the back chassis 3 which faces the display 4 in the display apparatus 1, and the plural circuit substrates are housed in the arrangement case 18, therefore, portions to which the arrangement case 18 is not attached in the display apparatus 1 can be reduced in thickness.

Additionally, it is not necessary to provide a case in which the circuit substrates are arranged and a case in which the speaker units 22, 22 are arranged separately as the speaker units 22, 22 are housed in the arrangement case 18 in addition to the circuit substrates. Therefore, the size of the display apparatus 1 can be reduced by using arrangement space efficiently. The size reduction is realized also by cutting the number of components, which can reduce manufacturing costs.

Furthermore, portions to which the arrangement case is not attached in the display apparatus 1 can be also reduced in thickness as the speaker units 22, 22 are housed in the arrangement case 18.

Moreover, as the arrangement case 18 is attached to the lower end portion of the back chassis 3, the center of gravity in the entire display apparatus 1 is positioned on a lower side, therefore, it is possible to secure a stable setting state of the display apparatus 1 and to prevent the display apparatus 1 from falling down due to the disturbance such as vibrations.

A stand 24 is provided on a lower surface of the arrangement case 18 (refer to FIG. 1 to FIG. 4). The stand 24 includes a base portion 25 placed on a mounting surface such as a desk, supporting surface portions 26, 26 fixed on the base portion 25 at one end portions respectively and connecting protrusions 27, 27 respectively attached to the other end portions of the supporting surface portions 26, 26.

The base portion 25 is formed in a bar shape folded in a given shape, a cross-sectional shape of which is, for example, a polygon such as a hexagon. The base portion 25 includes a mounting portion 25a extending in the right and left directions, intermediate portions 25b, 25b respectively protruding obliquely upward in the back direction from both end portions in right and left of the mounting portion 25a and connecting portions 25c, 25c protruding obliquely downward in the back direction from rear ends of the intermediate portions 25b, 25b. Portions where the mounting portion 25a is connected to the intermediate portions 25b, 25b in the base portion 25 are provided as receiving portions 28, 28.

The supporting surface portions 26, 26 are formed in a landscape-plate shape facing approximately in the upper and lower directions, outer end portions of which are respectively fixed to front end portions of the connecting portions 25c, 25c.

As the supporting surface portions 26, 26 are respectively fixed to the connecting portions 25c, 25c as described above, flat portions are formed in the connecting portions 25c, 25c by forming the cross-sectional shape of the base portion 25 to be a polygon such as a hexagon, therefore, a sufficient contact area of the supporting surface portions 26, 26 with respect to the connecting portions 25c, 25c can be secured. Accordingly, a stable fixing state of the supporting surface portions 26, 26 with respect to the connecting portions 25c, 25c can be obtained.

The cross-sectional shape of the base portion 25 is not limited to the polygon, and may be formed to be other shapes such as a circular shape, an elliptical shape and an oval shape.

The stand 24 is connected by screw clamping and so on in a state where the connecting protrusions 27, 27 are respectively inserted into the concave portions for arrangement 18a, 18a of the arrangement case 18 from below. In the state where the stand 24 is connected, inner end portions of the supporting surface portions 26, 26 touch the lower surface of the arrangement case 18 and the apparatus body 2 is held by the stand 24.

Figure 22:
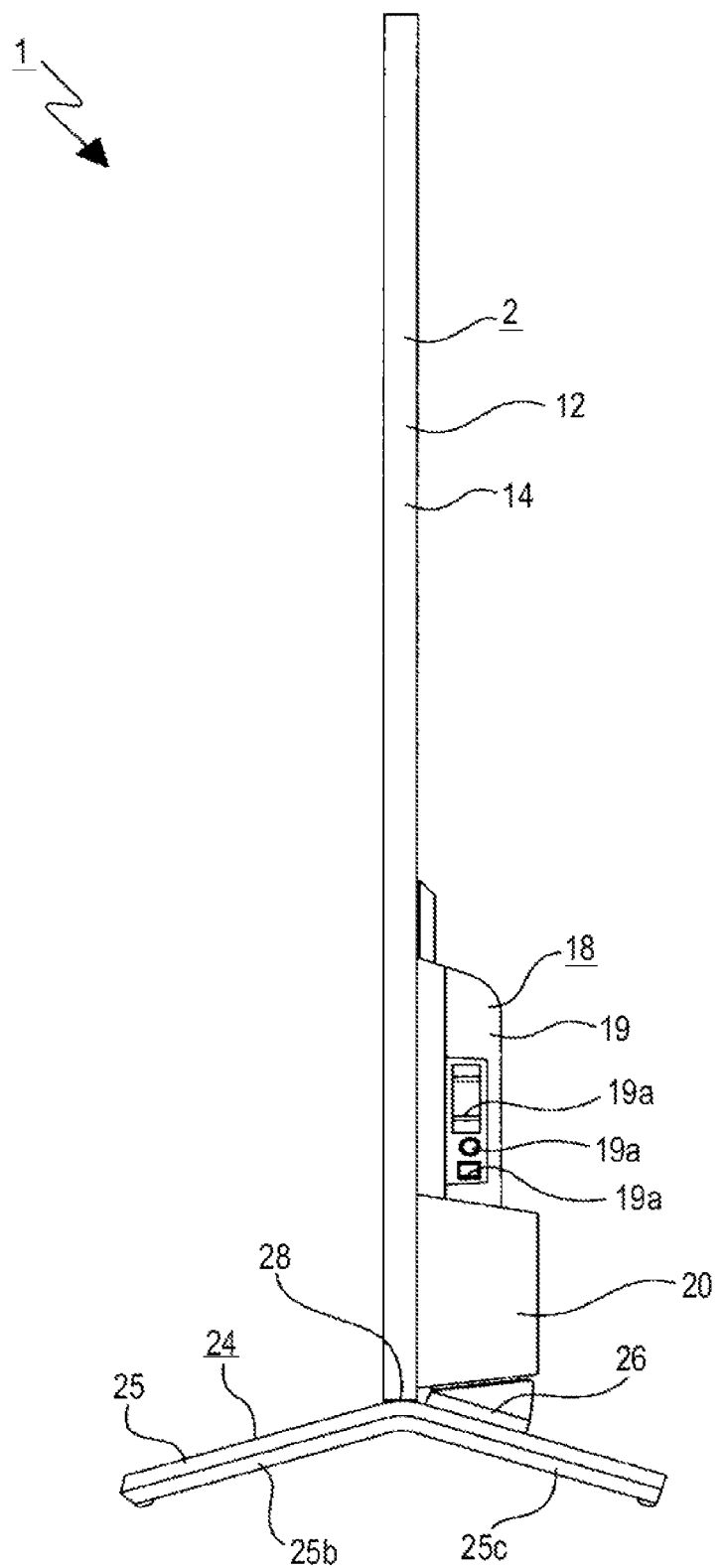
FIG. 22 is an enlarged side view showing a state where the stand is attached to an apparatus body.

As the stand 24 is in a state where the mounting portion 25a and rear end portions of the connecting portions 25c, 25c touch the mounting surface such as the desk, the apparatus body 2 is placed on the desk through the stand 24. At this time, the receiving portions 28, 28 of the stand 24 are positioned just below the frame 12, and lower frame portion 15 touches the receiving portions 28, 28, therefore, loads of the display 4, the rear cover 5 and the frame 12 are received by the receiving portions 28, 28 (refer to FIG. 22).

Accordingly, it is possible to place the display apparatus 1 on the mounting surface such as a desk in the stable state, which can secure the stable setting state of the display apparatus 1.

[Use Example of Stand]

Figure 23:
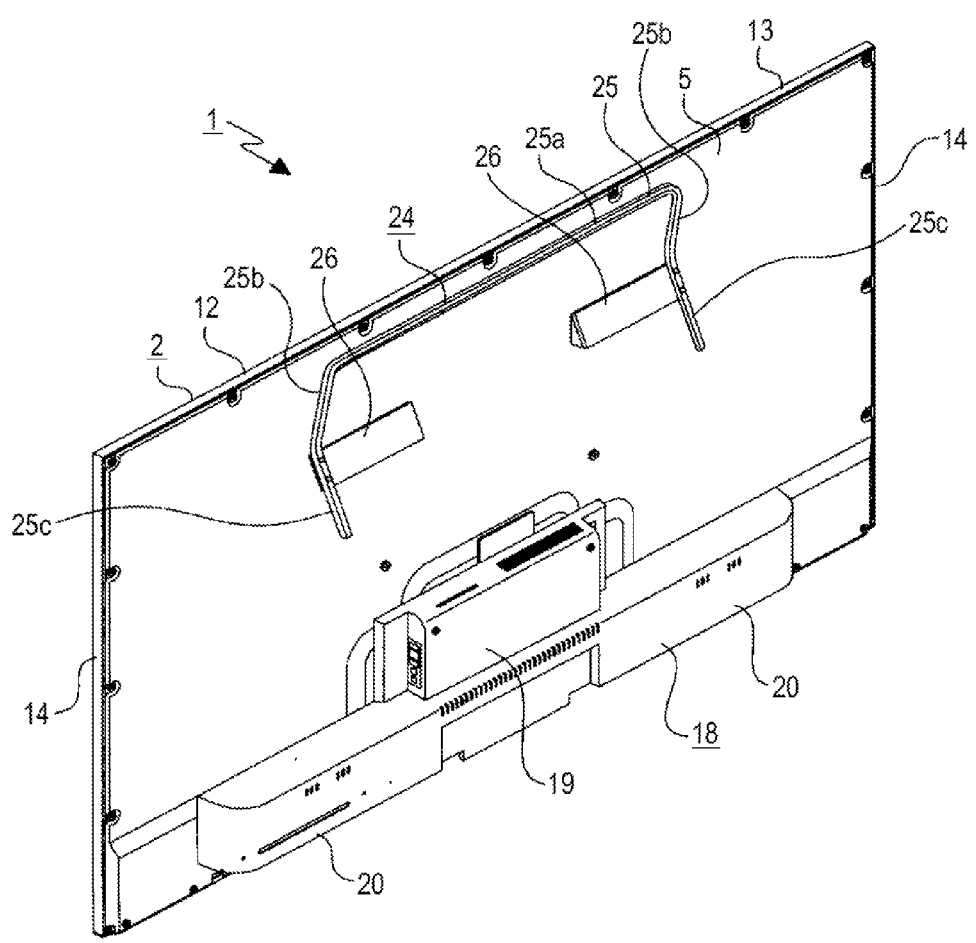
FIG. 23 is a perspective view showing an example in which the stand is used as an attachment member for wall hanging.
Figure 24:
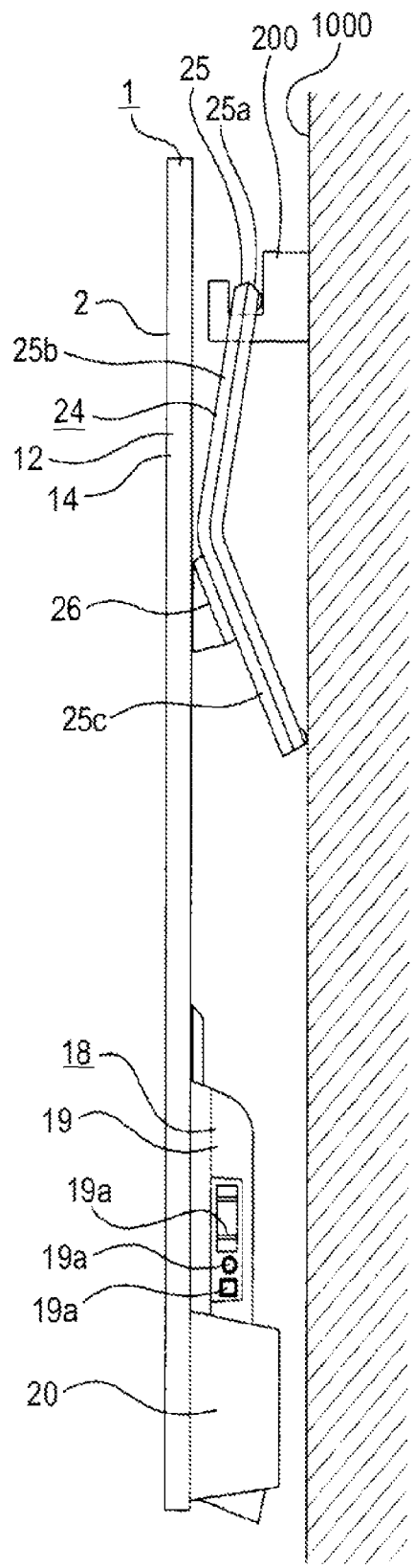
FIG. 24 is a side view showing the example in which the stand is used as the attachment member for wall hanging.

Another use example of the stand 24 will be explained below (refer to FIG. 23 and FIG. 24).

The example in which the stand 24 is used at the time of setting the apparatus on the mounting surface such as a desk has been shown as the above, however, it is also possible to use the stand 24 as an attachment member for wall hanging as described below.

When the stand 24 is used as the attachment member for wall hanging, the stand 24 is used by removing the connecting protrusions 27, 27 from the supporting surface portions 26, 26. The supporting surface portions 26, 26 of the stand 24 are attached to a back surface of the apparatus body 2 by, for example, screw clamping and so on in a state where the mounting portion 25a of the base portion 25 is positioned on the highest position.

In the state where the stand 24 is attached to the back surface of the apparatus body 2, the mounting portion 25a of the stand 24 is located at a position more backward than a rear surface of the arrangement case 18.

A bracket 200 is attached to a wall surface 1000, and the mounting portion 25a of the stand 24 is attached to the bracket 200, thereby allowing the display apparatus 1 to be in the wall hanging state. At this time, the mounting portion 25a of the stand 24 is located at the position more backward than the rear surface of the arrangement case 18, therefore, the arrangement case 18 does not interfere with the wall surface 1000 and a good wall hanging state of the display apparatus 1 can be secured.

As described above, the stand 24 is attached to the lower end portion of the apparatus body 2 to have a function of standing the apparatus body 2, and is also attached to the back surface of the apparatus body 2 to have a function of setting the apparatus body 2 so as to abut on the wall surface 1000.

Accordingly, it is possible to set the apparatus body 2 in a desired state by changing the position of attaching the stand 24 with respect to the apparatus body 2, which can improve usability.

[Brief]

As described above, the display apparatus 1 is provided with the display 4, the back chassis 3 and the rear cover 5, in which the through holes 3a, 3a, . . . piercing in the thickness direction are formed in the back chassis 3. The first reinforcing portion 6, the second reinforcing portions 7, 8, 9, 9 and the third reinforcing portions 10, 11, 11 are provided in the back chassis 3.

Accordingly, it is possible to secure high rigidity by the first reinforcing portion 6, the second reinforcing portions 7, 8, 9, 9 and the third reinforcing portions 10, 11, 11 provided in the back chassis 3 even when the thicknesses of the back chassis 3 and the rear cover 5 are reduced, and further, it is possible to reduce weight and increase rigidity while realizing the thickness reduction as the weight is reduced by the through holes 3a, 3a, . . . in the back chassis 3.

[Present Technology]

The present technology can also apply the following configurations.

(1) A display apparatus including a display displaying images on a display surface, a back chassis arranged in a position opposite to the display surface of the display, and a rear cover arranged in a position opposite to a surface of the back chassis which faces the display, in which through holes piercing in a thickness direction are formed in the back chassis and reinforcing portions are provided in the back chassis.

(2) The display apparatus described in the above (1), in which an arrangement case is attached to the rear cover in a position opposite to a surface which faces the back chassis, and circuit substrates are housed in the arrangement case.

(3) The display apparatus described in the above (2), in which speaker units are housed in the arrangement case.

(4) The display apparatus described in the above (2) or (3), in which the arrangement case is attached to a lower end portion of the rear cover.

(5) The display apparatus described in any of the above (1) to (4), in which a frame is attached to an outer peripheral portion of the display and an outer peripheral portion of the back chassis, and the frame is provided with a first presser-surface portion pressing the outer peripheral portion of the display, a second presser-surface portion pressing the outer peripheral portion of the back chassis, which faces the first presser-surface portion and a coupling surface portion coupling the first presser-surface portion to the second presser-surface portion, which faces the outer peripheral portion of the display and the outer peripheral portion of the back chassis.

(6) The display apparatus described in the above (5), in which the frame is provided with a holding surface portion holding an outer peripheral portion of the rear cover.

(7) The display apparatus described in any of the above (1) to (6), in which the reinforcing portions are formed by drawing processing.

(8) The display apparatus described in any of the above (1) to (7), in which the rear cover is formed by vacuum forming.

(9) The display apparatus described in any of the above (1) to (8), in which an apparatus body having the display, the back chassis and the rear cover is provided, a stand having a receiving portion, which is attached to the apparatus body to support the apparatus body, is provided, and in a state where the stand is attached to the apparatus body, the receiving portion is positioned just below the display and the back chassis to allow the receiving portion to receive loads of the display and the back chassis.

(10) The display apparatus described in any of the above (1) to (8), in which an apparatus body having the display, the back chassis and the rear cover is provided, a stand attached to the apparatus body to support the apparatus body is provided, and the stand is attached to a lower end portion of the apparatus body to have a function of standing the apparatus body, and the stand is also attached to a back surface of the apparatus body to have a function of setting the apparatus body so as to abut on a wall surface.

Specific shapes and structures of respective components shown in the above description of the preferred embodiment are merely examples of the embodiment of the present technology, and the technical scope of the present technology should not be interpreted in a restrictive manner.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
a display displaying images on a display surface;
a back chassis arranged in a position opposite to the display surface of the display; and
a rear cover arranged in a position opposite to a surface of the back chassis which faces the display,
the back chassis having (i) a number of reinforcing portions configured to increase rigidity and (ii) a number of through holes piercing in a thickness direction provided as a number of weight reducing cut-outs arranged in a predetermined manner with reference to the number of reinforcing portions to reduce weight of the back chassis.

2. The display apparatus according to claim 1,
wherein an arrangement case is attached to the rear cover in a position opposite to a surface which faces the back chassis, and circuit substrates are housed in the arrangement case.

3. The display apparatus according to claim 2,
wherein speaker units are housed in the arrangement case.

4. The display apparatus according to claim 2,
wherein the arrangement case is attached to a lower end portion of the rear cover.

5. The display apparatus according to claim 1,
wherein the reinforcing portions are formed by drawing processing.

6. The display apparatus according to claim 1,
wherein the rear cover is formed by vacuum forming.

7. The display apparatus according to claim 1,
wherein an apparatus body having the display, the back chassis and the rear cover is provided,
a stand having a receiving portion, which is attached to the apparatus body to support the apparatus body, is provided, and
in a state where the stand is attached to the apparatus body, the receiving portion is positioned just below the display and the back chassis to allow the receiving portion to receive loads of the display and the back chassis.

8. The display apparatus according to claim 1, in which each through hole in the number of through holes has a rectangular shape.

9. A display apparatus comprising:
a display displaying images on a display surface;
a back chassis arranged in a position opposite to the display surface of the display; and
a rear cover arranged in a position opposite to a surface of the back chassis which faces the display,
wherein through holes piercing in a thickness direction are formed in the back chassis, and reinforcing portions are provided in the back chassis,
wherein a frame is attached to an outer peripheral portion of the display and an outer peripheral portion of the back chassis, and
the frame is provided with a first presser-surface portion pressing the outer peripheral portion of the display, a second presser-surface portion pressing the outer peripheral portion of the back chassis, which faces the first presser-surface portion and a coupling surface portion coupling the first presser-surface portion to the second presser-surface portion, which faces the outer peripheral portion of the display and the outer peripheral portion of the back chassis.

10. The display apparatus according to claim 9,
wherein the frame is provided with a holding surface portion holding an outer peripheral portion of the rear cover.

11. A display apparatus comprising:
a display displaying images on a display surface;
a back chassis arranged in a position opposite to the display surface of the display; and
a rear cover arranged in a position opposite to a surface of the back chassis which faces the display,
wherein through holes piercing in a thickness direction are formed in the back chassis, and reinforcing portions are provided in the back chassis,
wherein an apparatus body having the display, the back chassis and the rear cover is provided,
a stand attached to the apparatus body to support the apparatus body is provided, and
the stand is attached to a lower end portion of the apparatus body to have a function of standing the apparatus body, and the stand is also attached to a back surface of the apparatus body to have a function of setting the apparatus body so as to abut on a wall surface.

12. A display apparatus comprising:
a display device having a display surface to display images;
a back chassis arranged in a position opposite to the display surface of the display device; and
a frame attached to an outer peripheral portion of the display device and an outer peripheral portion of the back chassis,
the frame having (i) a first presser-surface portion pressing the outer peripheral portion of the display device, (ii) a second presser-surface portion pressing the outer peripheral portion of the back chassis, which faces the first presser-surface portion, and (iii) a coupling surface portion coupling the first presser-surface portion to the second presser-surface portion, which faces the outer peripheral portion of the display and the outer peripheral portion of the back chassis.

* * * * *